(12) United States Patent
Yoneda et al.

(10) Patent No.: US 11,811,547 B2
(45) Date of Patent: Nov. 7, 2023

(54) CONTROL SYSTEM IN WHICH A PLURALITY OF APPARATUSES IN TIME SYNCHRONIZATION WITH ONE ANOTHER ARE CONNECTED TO A NETWORK

(71) Applicant: OMRON CORPORATION, Kyoto (JP)

(72) Inventors: Mitsuhiro Yoneda, Otsu (JP); Nobuyuki Sakatani, Otsu (JP); Ryota Akai, Kyoto (JP); Taiga Niimi, Kusatsu (JP); Shigenori Sawada, Takatsuki (JP)

(73) Assignee: OMRON CORPORATION, Kyoto (JP)

( * ) Notice: Subject to any disclaimer, the term of this patent is extended or adjusted under 35 U.S.C. 154(b) by 29 days.

(21) Appl. No.: 17/434,210

(22) PCT Filed: Feb. 18, 2020

(86) PCT No.: PCT/JP2020/006262
§ 371 (c)(1),
(2) Date: Aug. 26, 2021

(87) PCT Pub. No.: WO2020/189144
PCT Pub. Date: Sep. 24, 2020

(65) Prior Publication Data
US 2022/0173922 A1 Jun. 2, 2022

(30) Foreign Application Priority Data
Mar. 15, 2019 (JP) .................................. 2019-048251

(51) Int. Cl.
*H04L 12/28* (2006.01)
*H04J 3/06* (2006.01)
*H04L 67/12* (2022.01)

(52) U.S. Cl.
CPC ............ *H04L 12/28* (2013.01); *H04J 3/0638* (2013.01); *H04L 67/12* (2013.01)

(58) Field of Classification Search
CPC ......... H04L 12/28; H04L 67/12; H04L 12/44; H04L 69/24; H04L 69/28; H04L 1/1829;
(Continued)

(56) References Cited

U.S. PATENT DOCUMENTS

2001/0014087 A1 8/2001 Sugaya et al.
2002/0154600 A1 10/2002 Ido et al.
(Continued)

FOREIGN PATENT DOCUMENTS

EP   2 490 358 A2     8/2012
EP      2490358 A2 *  8/2012    ......... G05B 19/4186
(Continued)

OTHER PUBLICATIONS

Communication dated Aug. 2, 2022, issued in Chinese Application No. 202080017225.1.
(Continued)

*Primary Examiner* — Mewale A Ambaye
(74) *Attorney, Agent, or Firm* — Sughrue Mion, PLLC

(57) ABSTRACT

A control system, apparatus, and method are provided. In the control system, plural apparatuses in time synchronization with one another are connected to a network, and the network transfers a frame periodically exchanged by the apparatuses. The apparatuses include a control device and an apparatus controlled by the control device. Each apparatus in the control system is connected over the network, to a first apparatus that transmits a frame that arrives at each of the apparatuses and a second apparatus that receives a frame transmitted from each of the apparatuses. Each apparatus includes information on a frame transfer path and transfer timing based on a synchronous time. When a frame does not
(Continued)

arrive at defined time through the transfer path and when a condition associated with a cycle is satisfied, one or more of the apparatuses is configured to transmit a resend request through the transfer path.

9 Claims, 18 Drawing Sheets

(58) Field of Classification Search
CPC ..... H04L 1/1867; H04J 3/0638; H04J 3/0679; H04W 40/00
See application file for complete search history.

(56) References Cited

U.S. PATENT DOCUMENTS

| | | | | |
|---|---|---|---|---|
| 2002/0178273 | A1* | 11/2002 | Pardo-Castellote | H04L 67/12 709/230 |
| 2003/0120802 | A1 | 6/2003 | Kohno | |
| 2006/0055529 | A1* | 3/2006 | Ratiu | G05B 23/027 370/254 |
| 2010/0079356 | A1* | 4/2010 | Hoellwarth | H04B 1/385 345/8 |
| 2012/0179849 | A1 | 7/2012 | Mizutani | |
| 2016/0292110 | A1 | 10/2016 | Niwa et al. | |
| 2017/0171359 | A1* | 6/2017 | Ando | H04L 41/0233 |

FOREIGN PATENT DOCUMENTS

| | | |
|---|---|---|
| JP | 5-12146 A | 1/1993 |
| JP | 9-181772 A | 7/1997 |
| JP | 2002-84338 A | 3/2002 |
| JP | 2003-060699 A | 2/2003 |
| JP | 2003-169040 A | 6/2003 |
| JP | 2006-080847 A | 3/2006 |
| JP | 2010-124492 A | 6/2010 |
| JP | 2011-192068 A | 9/2011 |
| JP | 2012-95498 A | 5/2012 |
| JP | 2012-170036 A | 9/2012 |
| JP | 2014-120884 A | 6/2014 |
| JP | 2016-192172 A | 11/2016 |
| WO | 2006/028138 A1 | 3/2006 |

OTHER PUBLICATIONS

International Search Report of PCT/JP2020/006262 dated May 26, 2020 [PCT/ISA/210].
Written Opinion of PCT/JP2020/006262 dated May 26, 2020 [PCT/ISA/237].
Notification of Reasons for Refusal dated Jan. 31, 2023 from the Japanese Patent Office in application No. 2022-065758.
Communication dated Jul. 11, 2023, issued in Japanese Application No. 2022-065758.

* cited by examiner

FIG.8

| | | 173 | | | | 174 |
|---|---|---|---|---|---|---|
| 171 — | PORT(1) | N1 ADDRESS | N2 ADDRESS | ... | N3 ADDRESS | N1, N3 |
| 172 — | PORT(2) | M1 ADDRESS | M2 ADDRESS | ... | M3 ADDRESS | M1 |
| | ⋮ | ⋮ | ⋮ | ⋮ | ⋮ | |

| 183: STREAM ID | SENDER | ADDRESSEE | 184: ARRIVAL TIME | 185: OUTPUT SYNCHRONIZATION | 186: PORT ID |
|---|---|---|---|---|---|
| SX | N1 | N3 | T1 | 1 | P1 |
| SY | N1 | M3 | T2 | 0 | P2 |
| ⋮ | ⋮ | ⋮ | ⋮ | ⋮ | ⋮ |

CONTROL SYSTEM IN WHICH A PLURALITY OF APPARATUSES IN TIME SYNCHRONIZATION WITH ONE ANOTHER ARE CONNECTED TO A NETWORK

CROSS REFERENCE TO RELATED APPLICATIONS

This application is a National Stage of International Application No. PCT/JP2020/006262 filed on Feb. 18, 2020, claiming priority based on Japanese Patent Application No. 2019-048251 filed on Mar. 15, 2019, the entire contents of each of which being herein incorporated by reference in their entireties.

TECHNICAL FIELD

The present disclosure relates to a control system, an apparatus, and a control method.

BACKGROUND ART

With recent advance of information and communication technology (ICT), such a system as integrally networking also production lines of factory automation (FA) ranging from manufacturing equipment in a field to programmable logic controllers (PLCs) has been realized. In realizing such networking, for example, PTL 1 (Japanese Patent Laying-Open No. 2011-192068) discloses a configuration for reliable communication among units implementing a PLC, in which a master unit transmits in a batch, a plurality of transmission frames addressed to different slave units successively a plurality of times (for example, three times) without waiting for reception of response from the slave units.

CITATION LIST

Patent Literature

PTL 1: Japanese Patent Laying-Open No. 2011-192068

SUMMARY OF INVENTION

Technical Problem

In PTL 1, the master unit transmits the plurality of transmission frames addressed to different slave units successively a plurality of times regardless of whether or not a frame has arrived at a slave unit, and hence an amount of transfer of frames is large. Therefore, an environment in which reliable communication among units can efficiently be realized has been demanded.

One of objects of the present disclosure is to provide a control system, an apparatus, and a method that allow efficient communication.

Solution to Problem

According to one aspect of this disclosure, a control system in which a plurality of apparatuses in time synchronization with one another are connected to a network is provided. The network is configured to transfer a frame periodically exchanged by the plurality of apparatuses. The plurality of apparatuses include at least one control device and an apparatus controlled by the control device. Each of the plurality of apparatuses is connected over the network, to a first apparatus configured to transmit a frame that arrives at each of the plurality of apparatuses and a second apparatus configured to receive a frame transmitted from each of the plurality of apparatuses. Each apparatus includes information on a frame transfer path and transfer timing based on synchronous time. When a frame does not arrive at defined time through the transfer path and when a condition associated with a cycle is satisfied, at least one of the plurality of apparatuses is configured to transmit a resend request through the transfer path.

According to the disclosure described above, the apparatus transmits the resend request only when a frame does not arrive at the defined time and when the condition associated with the cycle is satisfied. Therefore, even when the resend request is transmitted in the event of non-arrival, increase in consumption of a communication band of the network can be limited and reliable communication among apparatuses can efficiently be realized.

In the disclosure described above, the cycle includes a time period for exchange of the frame by the plurality of apparatuses and a time period for a control operation performed by the at least one control device based on data in the exchanged frame, and the condition includes a condition based on an allowance time calculated by subtracting the time period for exchange of the frame and the time period for the control operation from the cycle and a time period for response to the resend request.

According to the disclosure described above, the condition on which determination as to transmission of the resend request is based can be set based on the allowance time within the cycle and the time period for response to the resend request.

In the disclosure described above, when the condition associated with the cycle is not satisfied, the at least one control device is configured to perform the control operation based on data in a frame that arrived in a previous cycle or to use a value calculated in the previous cycle for control.

In the disclosure described above, when the resend request cannot be transmitted, control can be based on data in the frame that arrived in the previous control cycle or the calculated value.

In the disclosure described above, when the at least one apparatus transfers the resend request to the first apparatus over the network, the at least one apparatus is configured to transfer a frame non-arrival notification to the second apparatus over the network.

According to the disclosure described above, an apparatus at which the frame does not arrive can transmit the resend request and can also transfer, instead of the frame, the non-arrival notification to an apparatus to which the frame is to be transferred. Therefore, by transmitting the non-arrival notification to the apparatus which is a transfer destination, transmission of the resend request by the apparatus which is the transfer destination can be suppressed. As set forth above, increase in consumption of the communication band can thus be suppressed.

In the disclosure described above, the frame transferred by the network includes a frame of control-oriented data used for the control and a frame of non-control-oriented data, and the at least one apparatus is configured to transmit the resend request only for the frame of the control-oriented data, of the frame of the control-oriented data and the frame of the non-control-oriented data.

According to the disclosure described above, the resend request is transmitted only for control-oriented data. Therefore, even when the resend request is transmitted, increase in consumption of the communication band can be suppressed as set forth above.

In the disclosure described above, the at least one apparatus is connected to a plurality of first apparatuses over the network, and the at least one apparatus includes a resend processing module configured to detect an apparatus capable of responding to the resend request among the plurality of first apparatuses and to transmit the resend request to the detected apparatus.

According to the disclosure described above, the resend request can be transmitted only to the apparatus capable of responding to the resend request. Therefore, even when the resend request is transmitted, increase in consumption of the communication band can be suppressed as set forth above.

In the disclosure described above, a protocol for network communication between the control devices and a protocol for network communication between the control device and the controlled apparatus are identical.

According to the disclosure described above, the protocol is common to the apparatuses. Therefore, since protocol conversion among the apparatuses due to difference in protocol in frame transfer can be obviated and communication can accordingly be faster.

According to one aspect of the disclosure described above, an apparatus included in a control system is provided. The control system includes a plurality of apparatuses connected to a network and being in time synchronization with one another. The network is configured to transfer a frame periodically exchanged by the plurality of apparatuses. The apparatus is connected over the network, to a first apparatus configured to transmit a frame that arrives at the apparatus and a second apparatus configured to receive a frame transmitted from the apparatus. The apparatus includes information on a frame transfer path and transfer timing based on synchronous time. When a frame does not arrive at defined time through the transfer path and when a condition associated with a cycle is satisfied, the apparatus is configured to transmit a resend request through the transfer path.

According to the disclosure described above, the apparatus transmits the resend request only when a frame does not arrive at the defined time and when the condition associated with the cycle is satisfied. Therefore, even when the resend request is transmitted in the event of non-arrival, increase in consumption of a communication band of the network can be limited and reliable communication among apparatuses can efficiently be realized.

According to one aspect of this disclosure, a method of controlling communication of an apparatus included in a control system is provided. The control system includes a plurality of apparatuses connected to a network and being in time synchronization with one another. The network is configured to transfer a frame periodically exchanged by the plurality of apparatuses. The apparatus is connected over the network, to a first apparatus configured to transmit a frame that arrives at the apparatus and a second apparatus configured to receive a frame transmitted from the apparatus. The apparatus includes information on a frame transfer path and transfer timing based on synchronous time. The method of controlling communication of an apparatus includes receiving a frame that arrives at the apparatus over the network, detecting whether or not the frame arrives at the apparatus at defined time through the transfer path, and transmitting, when the frame does not arrive and when a condition associated with a cycle is satisfied, a resend request through the transfer path.

According to the disclosure described above, the apparatus transmits the resend request only when a frame does not arrive at the defined time and when the condition associated with the cycle is satisfied. Therefore, even when the resend request is transmitted in the event of non-arrival, increase in consumption of a communication band of the network can be limited and reliable communication among apparatuses can efficiently be realized.

Advantageous Effects of Invention

According to the present disclosure, a control system, an apparatus, and a method that allow efficient communication are provided.

BRIEF DESCRIPTION OF DRAWINGS

FIG. 8 is a diagram schematically showing an exemplary configuration of a connection information table 170 according to the present embodiment.

FIG. 9 is a diagram schematically showing exemplary schedule information 180 according to the present embodiment.

DESCRIPTION OF EMBODIMENTS

Figure 1:
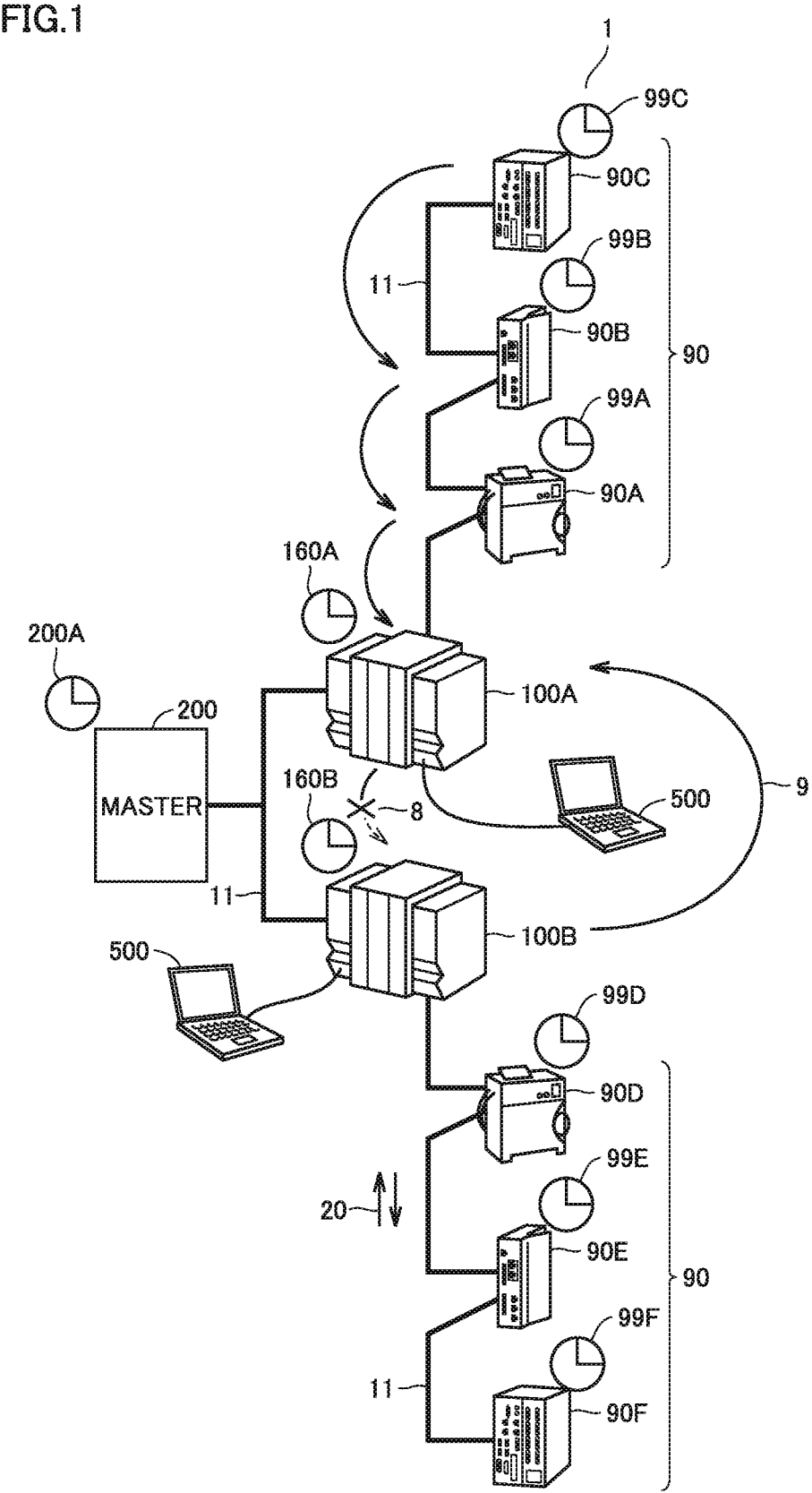
FIG. 1 is a diagram schematically showing an exemplary configuration of a control system 1 according to the present embodiment.

The present embodiment will be described in detail with reference to the drawings. The same or corresponding elements in the drawings have the same reference characters allotted and description thereof will not be repeated.

<A. Application>

An exemplary scene to which the present invention is applied will initially be described. FIG. 1 is a diagram schematically showing an exemplary configuration of a control system 1 according to the present embodiment. Referring to FIG. 1, control system 1 that can be applied to FA includes, for example, a PLC 100A, a PLC 100B, and a field apparatus group that represent one example of an "apparatus" that is connected to a network 11 and exchanges data over network 11. Control system 1 includes a master 200 that can provide master clock for time synchronization. Master clock for time synchronization provided by master 200 may be provided instead, for example, by a switch with a time master function or any PLC.

In the present embodiment, time synchronization can be achieved, for example, by establishing data communication in conformity with time-sensitive networking (TSN) over network 11. "Timing" represents a concept of a time point, a time period, or a time of day when some kind of instance occurs.

PLC 100A and PLC 100B represent one example of the "control device" that performs a control operation, and perform similar functions in the present embodiment. When PLC 100A and PLC 100B are not distinguished from each other, they are collectively referred to as a PLC 100. A support apparatus 500 can be connected to PLC 100. The field apparatus group includes various field apparatuses 90A to 90F. Field apparatuses 90A to 90F are each connected to an "object to be controlled" in accordance with reception data from PLC 100 over a network 2, however, field apparatus 90 may be provided as being integrally configured with the object to be controlled. Therefore, in the present embodiment, field apparatus 90 corresponds to an apparatus controlled by PLC 100. Since field apparatuses 90A to 90F are basically similar to one another in function in the present embodiment, they are collectively referred to as a "field apparatus 90" when they are not distinguished from one another.

The object to be controlled described above may include an actuator that applies some physical action onto a manufacturing apparatus or a production line (which is also collectively referred to as a "field" below) and an input and output apparatus such as a sensor that exchanges information with the field.

Field apparatuses 90A, 90B, and 90C are sequentially connected in a daisy chain to PLC 100A over network 11, and field apparatuses 90D, 90E, and 90F are sequentially connected in a daisy chain to PLC 100B over network 11.

In the present embodiment, a field value sensed in the object to be controlled is transferred over network 11. A concept of the "field value" may also encompass a series of values obtained by continuous (or intermittent at certain intervals) sensing of change over time in data (value) on any object to be controlled.

The "field value" herein refers to a concept to collectively refer to values (actual values) available in a control operation in PLC 100 and may typically encompass an output from a sensor obtained from an object to be controlled and provided to a control operation. A value calculated in a control operation based on the field value may include an instruction value and a control amount for controlling the "object to be controlled." PLC 100 transfers "control-oriented data" including such a field value, an instruction value, and a control amount over network 11. The "control-oriented data" should be updated in PLC 100 or field apparatus 90 every predetermined cycle (for example, every control cycle 10 which will be described later) for use in control of an object to be controlled in a manufacturing apparatus or a production facility. Since the control-oriented data is thus used for control of an object to be controlled, it should cyclically be transferred over network 11 and this communication cycle should reliably be guaranteed. Control-oriented data exchanged between PLC 100 and field apparatus 90 over network 11 is updated in very short cycles from the order of several hundred microseconds to the order of several ten milliseconds.

Non-control-oriented data different from control-oriented data may also be transferred over network 11 shown in FIG. 1. Non-control-oriented data includes, for example, "information-oriented data" or "control information-oriented data." Though they do not require cyclic transfer in a control cycle as that for control-oriented data, they require regularity in terms of time to some extent. Information-oriented data includes data on management of the control system. Control information-oriented data includes data on setting and management of an apparatus or an object to be controlled included in control system 1.

A bus or a network which allows guaranteed time of arrival of data in conformity with TSN standards and through which communication is cyclically established is preferably adopted for network 11. For example, a network associated with a known protocol such as EtherNet/IP™ as a protocol higher in order than TSN may be adopted as network 11. EtherNet/IP™ represents such an industrial open network that a control protocol is implemented on general-purpose Ethernet™.

Control system 1 shown in FIG. 1 requires guaranteed time of arrival of data (control-oriented data) sent from a sender to a destination (an addressee) as set forth above. Therefore, control system 1 makes scheduling for data transfer so as to secure a communication band for control-oriented data in a communication band of network 11 while it maintains a predetermined control cycle (control cycle 10 which will be described later). More specifically, scheduling for data transfer is made such that control-oriented data is transferred preferentially over control information-oriented data and information-oriented data.

In order to perform a scheduling function while time of arrival at an addressee is guaranteed, in control system 1, each of a plurality of apparatuses (PLC 100 and field apparatus 90) in time synchronization with each other includes a timer in time synchronization (or a counter incremented or decremented in synchronization) and each apparatus determines timing of transmission or reception of data in accordance with the timer or the counter.

In FIG. 1, PLCs 100A and 100B include timers 160A and 160B, respectively, and field apparatuses 90A to 90F include timers 99A to 99F, respectively. For example, in control system 1, a timer 200A of master 200 functions as a grand master and the timer of PLC 100 and the timer of field apparatus 900 are synchronized in timing with the grand master being defined as the reference. Owing to such synchronization among the timers, data transfer timing can match or can be synchronized among apparatuses in control system 1.

Network 11 transfers communication frame 20 in which data is stored. A cycle of transfer of communication frame 20 in which control-oriented data is stored is in synchronization with control cycle 10. Therefore, in each apparatus, arrival of control-oriented data for each control cycle is basically guaranteed for each control cycle.

Each apparatus is connected over network 11, to a first apparatus that transmits communication frame 20 that arrives at each apparatus and a second apparatus that receives communication frame 20 transmitted from each apparatus. Each apparatus includes an area where path information representing a path for transfer of communication frame 20 and timing information representing transfer timing based on synchronous time are stored and communication frame 20 that arrives at each apparatus or communication frame 20 transmitted from each apparatus is held (stored).

When at least one of a plurality of apparatuses connected to network 11 determines that communication frame 20 does not arrive over network 11 at time defined based on timing information and when a condition associated with the cycle is satisfied, it transmits over network 11, a resend request 9 to resend communication frame 20 that does not arrive. Thus, even when the communication frame does not arrive, arrival of control-oriented data described above can be guaranteed.

Transmission of resend request 9 will be described with reference to FIG. 1. For example, in one control cycle, communication frame 20 of a field value of field apparatus 90C is transferred over network 11, and arrives at PLC 100A through field apparatus 90B and field apparatus 90A. When frame loss 8 occurs during transfer, lost communication frame 20 does not arrive at PLC 100A. When PLC 100A senses that communication frame 20 from field apparatus 90C does not arrive at defined time based on timing information and when it determines that a condition that there is allowance time for performing frame resend processing within the cycle is satisfied, it transmits resend request 9 to network 11.

PLC 100A can determine an addressee of resend request 9. For example, PLC 100A determines the first apparatus that transmits communication frame 20 that arrives at PLC 100A as the addressee. Alternatively, when a plurality of first apparatuses are connected to network 11, PLC 100A determines as the addressee, an apparatus with a function to respond to resend request 9 among the plurality of first apparatuses. Alternatively, PLC 100A determines as the addressee, an apparatus connected closest to PLC 100A among apparatuses with the response function. Each apparatus transmits requested communication frame 20 to a requesting apparatus in response to received resend request 9.

Thus, in control system 1, each apparatus connected to network 11 determines failure (frame loss 8) or success of arrival of communication frame 20 from a point of view of time based on synchronous time, and when determination as frame loss 8 is made, each apparatus transmits resend request 9. Therefore, probability of arrival of a frame at each apparatus can be enhanced by efficient communication, without relying on a plurality of times of successive transmission as in PTL 1. A more specific application of the present embodiment will be described below.

<B. Hardware Configuration of PLC 100>

Figure 2:
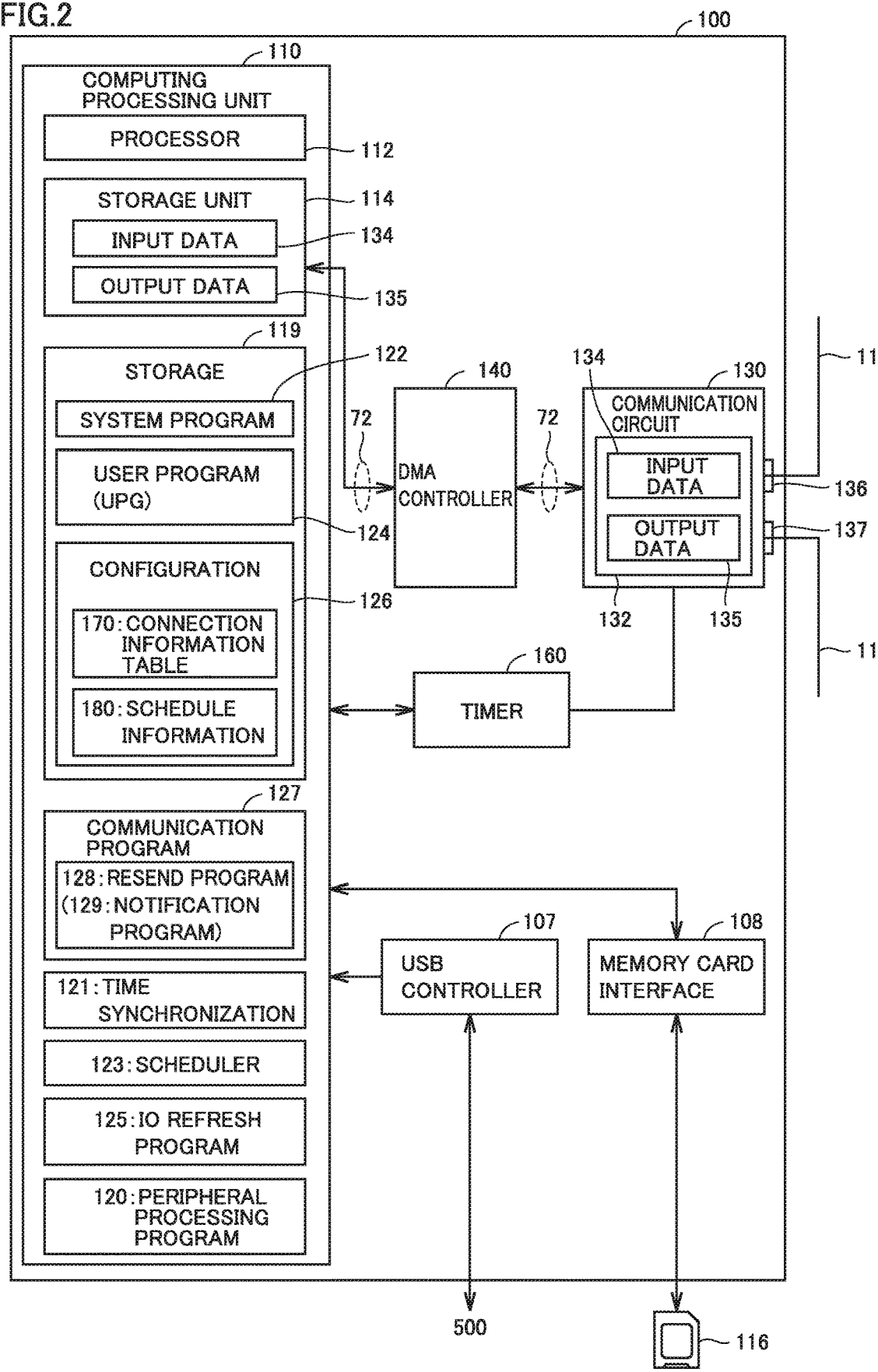
FIG. 2 is a schematic diagram showing a configuration of a main part of a PLC 100 according to the present embodiment.

FIG. 2 is a schematic diagram showing a configuration of a main part of PLC 100 according to the present embodiment. Referring to FIG. 2, PLC 100 includes a computing processing unit 110, a communication circuit 130, a direct memory access (DMA) controller 140, a highly accurate timer 160, a universal serial bus (USB) controller 107, communication ports 136 and 137 for connection to network 11, and a memory card interface 108.

Computing processing unit 110 includes a processor 112, a storage unit 114, and a storage 119. For the sake of convenience of description, PLC 100 includes only a single processor 112, however, a plurality of processors may be mounted. Each processor may include a plurality of cores. In computing processing unit 110, processor 112 periodically performs one or more tasks. When computing processing unit 110 performs a plurality of tasks, different priority may be set for the plurality of tasks.

Processor 112 transfers communication frame 20 (for example, input data 134 or output data 135) stored in a later-described buffer 132 of communication circuit 130 to storage unit 114. Storage unit 114 is implemented by a dynamic random access memory (DRAM) or a static random access memory (SRAM) and provides a work area necessary for execution of a program in processor 112.

Storage 119 is implemented by a flash memory or a hard disk, and a peripheral processing program 120, a time synchronization program 121 for setting time synchronization, an IO refresh program 125, a system program 122, a scheduler 123, a user program (UPG) 124, a communication program 127, and a configuration 126 are stored therein.

System program 122 includes an operating system (OS) for executing user program 124 in processor 112 and a library. IO refresh program 125 transmits a field value (input data) included in communication frame 20 received through communication circuit 130 to computing processing unit 110. IO refresh program 125 transmits an instruction value and a control amount (output data) calculated in PLC 100 to field apparatus 90. IO refresh program 125 thus performs processing (TO refresh processing which will be described later) for transferring at least any of input data and output data.

User program 124 is a program for "control operation processing" arbitrarily created depending on a machine or a facility to be controlled. Specifically, user program 124 includes a control operation program for performing an operation based on input data 134 in storage unit 114 for "sequence control" of an object to be controlled and a motion program for performing an operation based on input data 134 for "motion control." In motion control, an instruction value including a numerical value of a position, a speed, an acceleration, and an angle for an actuator such as a servo motor to be controlled is calculated. A calculated value such as a control amount or an instruction value resulting from control operation processing by user program 124 is stored as output data 135 in storage unit 114.

Communication program 127 controls communication circuit 130 to generate communication frame 20 based on output data 135 in storage unit 114 and to transmit and receive communication frame 20. Communication program 127 includes a resend program 128 for resend processing involved with resend of communication frame 20. Resend program 128 controls communication circuit 130 to generate communication frame 20 for resend request 9 and to transmit communication frame 20 over network 11 when communication frame 20 does not arrive. Resend program 128 includes a notification program 129. When resend request 9 is transmitted, notification program 129 controls communication circuit 130 to generate communication frame 20 for a non-arrival notification 6 to the effect that communication frame 20 does not arrive at (reach) PLC 100 and to transmit communication frame 20 over network 11.

Peripheral processing program 120 is processing that is different from control operation processing performed by user program 124 and is performed on a periphery of control operation processing. The peripheral processing program includes, for example, processing for logging communication frame 20 exchanged over network 11.

Scheduler 123 is a program configured to manage allocation of a resource or execution timing in accordance with priority for a process or a task of PLC 100. Such a process or task includes a process or a task that may be generated as a result of execution by processor 112, of peripheral processing program 120, user program 124, IO refresh program 125, time synchronization program 121, or communication program 127. Scheduler 123 adjusts based on timer 160 in time synchronization, timing of execution of each program, for example, in a cycle based on a predetermined control cycle. PLC 100 can thus cyclically perform control operation processing and IO refresh processing in a cycle based on time in synchronization with field apparatus 90.

Configuration 126 includes various set values necessary for execution of a program in PLC 100 or various set values that define a network configuration. Configuration 126 includes, for example, a later-described connection information table 170 which is exemplary "information on a transfer path" and later-described schedule information 180 which is exemplary "information on transfer timing."

USB controller 107 allows detachable connection of support apparatus 500 to PLC 100. Memory card interface 108 is constructed such that a memory card 116 is attachable thereto and detachable therefrom, and allows writing of data into memory card 116 and reading of various types of data (the user program or data) from memory card 116. Data in configuration 126 may be loaded from memory card 116 or support apparatus 500 into storage 119.

Communication circuit 130 is connected to communication ports 136 and 137 for physical connection to network 11. For example, network 11 connected to a side of another PLC 100 is connected to communication port 136, and network 11 connected to a side of field apparatus 90 is connected to communication port 137, although limitation as such is not intended. Communication circuit 130 exchanges communication frame 20 with another apparatus through communication ports 136 and 137. Communication circuit 130 includes buffer 132 in which communication frame 20 transmitted and received over network 11 is temporarily stored. Communication frame 20 temporarily stored in buffer 132 includes, for example, input data 134 and output data 135. Communication port 136 connected to network 11 connected to the side of PLC 100 is also called a "first port" below and communication port 137 connected to network 11 connected to the side of field apparatus 90 (a non-PLC 100 side) is also called a "second port" below.

Communication frame 20 is transmitted and received by communication circuit 130, for example, as below. In response to an instruction from processor 112, communication circuit 130 copies communication frame 20 based on output data 135 from storage unit 114 through DMA controller 140, stores the copy in buffer 132 as output data 135, and transmits communication frame 20 over network 11.

In response to an instruction from processor 112, communication circuit 130 copies communication frame 20 that arrives (is received) from network 11, stores the copy in buffer 132 as input data 134, and provides communication frame 20 to computing processing unit 110. This communication frame 20 is stored in storage unit 114 as the input data.

Data in transmitted and received communication frame 20 may be accumulated in storage unit 114 over a period longer than control cycle 10, or only data in communication frame 20 in latest control cycle 10 may be accumulated therein.

In the present embodiment, "IO refresh processing" by PLC 100 includes at least one of transmission of output data 135 (communication frame 20) to another apparatus and reception of input data 134 from another apparatus. In "IO refresh processing," input data 134 corresponds to communication frame 20 for a field value collected and transferred by field apparatus 90, and output data 135 corresponds to communication frame 20 for an instruction value or a control amount calculated in control operation processing by user program 124 of PLC 100.

DMA controller 140 is connected to computing processing unit 110 and communication circuit 130, and performs a function to accelerate data access between computing processing unit 110 and communication circuit 130. DMA controller 140 transfers communication frame 20 (for example, input data 134) stored in buffer 132 of communication circuit 130 to storage unit 114. DMA controller 140 gives an instruction to communication circuit 130, for example, in response to a communication request from processor 112, and transmits input data 134 stored in buffer 132 of communication circuit 130 to storage unit 114. DMA controller 140 transmits output data 135 stored in storage unit 114 to communication circuit 130 in response to a communication request from processor 112. With a hard-wired configuration of at least a main part of DMA controller 140, processing faster than processing by processor 112 can be achieved. Transfer of communication frame 20 between communication circuit 130 and computing processing unit 110 through such DMA controller 140 (DMA processing shown with a dashed ellipse in the figure) can be achieved in IO refresh processing by an IO refreshing unit 72 which will be described later. A case for realizing this transfer may also include a case in which, in reception of input data 134 by communication circuit 130, DMA processing is performed within IO refresh processing, and in transmission of output data 135 by communication circuit 130, output data 135 is transferred to buffer 132 of communication circuit 130 in DMA processing before IO refresh processing (at a time point when output data 135 is ready), and transmission of communication frame 20 of output data 135 from communication circuit 130 is started immediately after start of IO refresh processing. By thus transferring output data 135 to buffer 132 of communication circuit 130 before IO refresh processing, a time period for IO refresh processing can be shortened and jitter of transmission timing can be lessened.

Timer 160 is a kind of clock for determining timing between PLC 100 and another apparatus connected to PLC 100, and implemented by a counter or the like that counts up in prescribed cycles.

Though a configuration in which computing processing unit 110, communication circuit 130, and DMA controller 140 are distinguished from one another is depicted in the configuration shown in FIG. 2 for the sake of convenience of description, any form of implementation can be adopted without being limited as such. For example, a system on chip (SoC) in which the entirety or a part of computing processing unit 110 and the entirety or a part of communication circuit 130 are mounted on an identical chip may be configured. Alternatively, an SoC in which processor 112 of computing processing unit 110 and main functions of DMA controller 140 are mounted on an identical chip may be employed. Selection from these forms of implementation can be made as appropriate.

<C. Hardware Configuration of Field Apparatus 90>

Figure 3:
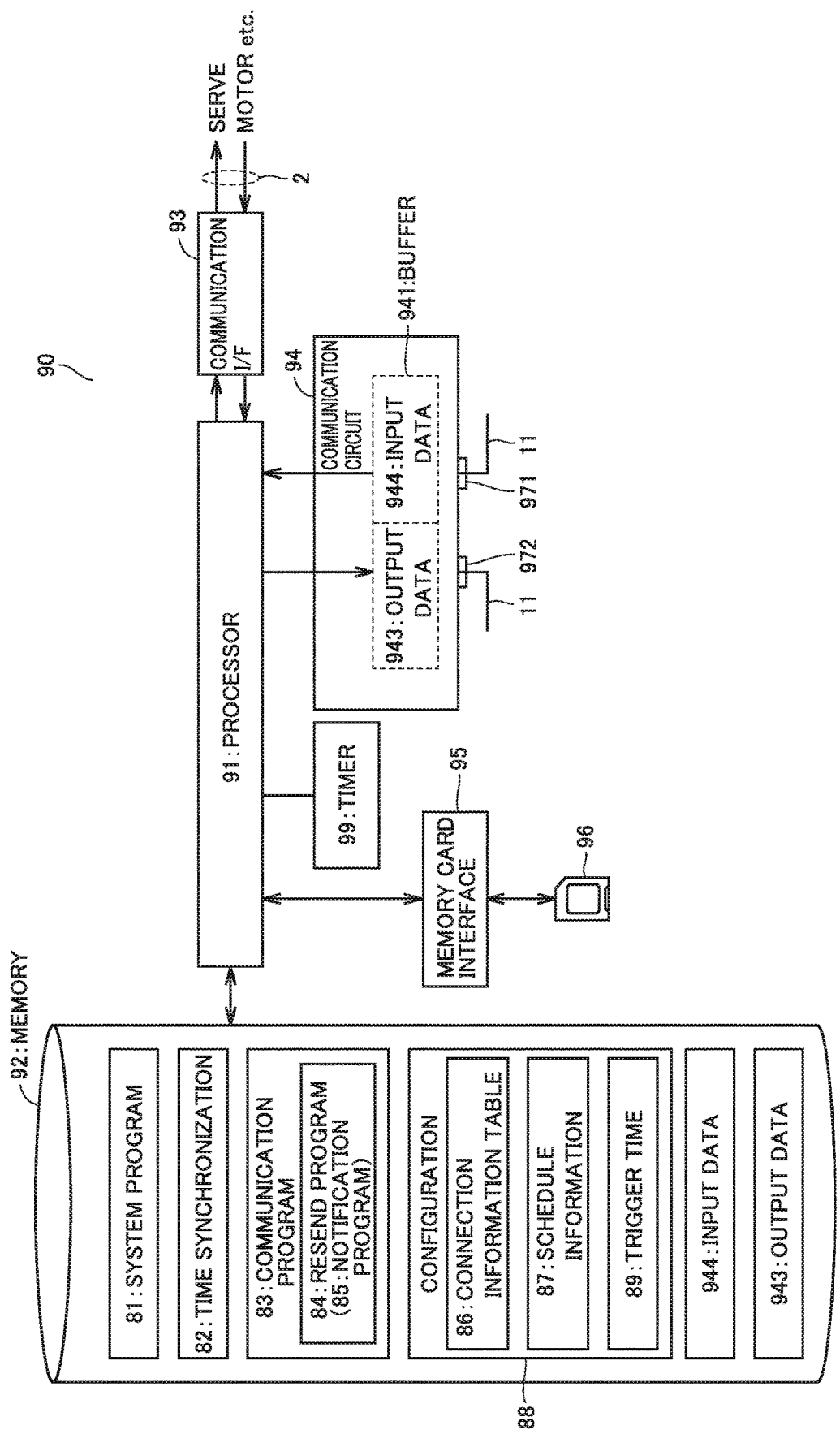
FIG. 3 is a diagram schematically showing a configuration of a main part of a field apparatus 90 according to an embodiment of the present invention.

FIG. 3 is a diagram schematically showing a configuration of a main part of field apparatus 90 according to an embodiment of the present invention. Referring to FIG. 3, field apparatus 90 includes a processor 91, a memory 92, a communication interface (I/F) 93 to which network 2 is connected, a communication circuit 94 to which network 11 is connected, a timer 99 configured similarly to timer 160 of PLC 100, and a memory card interface 95 to which a memory card 96 is detachably attached. Field apparatus 90 may include also a device such as an input/output (TO) unit or a servo. Such a device may include no function and no circuitry for handling memory card 96. Therefore, field apparatus 90 may include also an apparatus without a function and circuitry relating to memory card 96.

Communication I/F 93 receives a field value from an object to be controlled over network 2 and transmits an instruction value or a control amount from processor 91 to an object to be controlled in response to an instruction from processor 91. The object to be controlled is thus controlled in accordance with the instruction value or the control amount and provides a field value resulting therefrom.

Communication circuit 94 includes communication ports 971 and 972 to which network 11 is physically connected. Communication circuit 94 exchanges communication frame 20 with another apparatus through communication ports 971 and 972. Network 11 connected to the side of PLC 100 is connected to communication port 971 and network 11 connected to the side of field apparatus 90 is connected to communication port 972, although limitation as such is not intended. Therefore, communication port 971 corresponds to the "first port" and communication port 972 corresponds to the "second port."

Communication circuit 94 includes a buffer 941 in which communication frame 20 transmitted and received over network 11 is temporarily stored. Communication frame 20 is temporarily stored in buffer 941, for example, as input data 944 or output data 943.

Memory 92 is implemented by a DRAM or an SRAM and provides a work area necessary for execution of a program in processor 91. Memory 92 is further implemented by a flash memory or a hard disk, and a system program 81, a time synchronization program 82 for setting time synchronization, a communication program 83, a configuration 88, output data 943, and input data 944 are stored therein. Output data 943 and input data 944 correspond to communication frame 20. A program or data is stored in memory 92 from support apparatus 500 through PLC 100 or from memory card 96 through memory card interface 95.

Communication program 83 is a program for controlling communication I/F 93 and communication circuit 94. Communication program 83 includes a resend program 84 for resend processing and a notification program 85 in connection with control of communication circuit 94. Resend program 84 controls communication circuit 94 to transmit resend request 9 over network 11 when communication frame 20 does not arrive (reach). Notification program 85 controls communication circuit 94 to transmit communication frame 20 for non-arrival notification 6 to another apparatus when resend request 9 is transmitted.

Configuration 88 includes various set values necessary for execution of a program in field apparatus 90 or various set values that define a network configuration. Configuration 88 includes, for example, a later-described connection information table 86 which represents exemplary "information on a transfer path" and later-described schedule information 87 which represents exemplary "information on transfer timing." Configuration 88 further includes information on trigger time 89. Trigger time 89 indicates time at which field apparatus 90 controls an object to be controlled in accordance with an instruction value or a control amount received from PLC 100. Each field apparatus 90 detects arrival of trigger time 89 based on timer 99. Timers 99 of field apparatuses 90 are in time synchronization thereamong. Therefore, when trigger time 89 comes, objects to be controlled by field apparatuses 90 can be controlled in synchronization.

In response to an instruction from processor 91, communication circuit 94 copies communication frame 20 of output data 943 in memory 92, stores the copy in buffer 941 as output data 943, and transmits communication frame 20 over network 11. In response to an instruction from processor 91, communication circuit 94 receives communication frame 20 that arrives from network 11, copies communication frame 20, and stores the copy in buffer 941 as input data 944. Processor 91 has input data 944 in communication frame 20 stored in memory 92.

<D. Configuration of Communication Frame 20>

Figure 4:
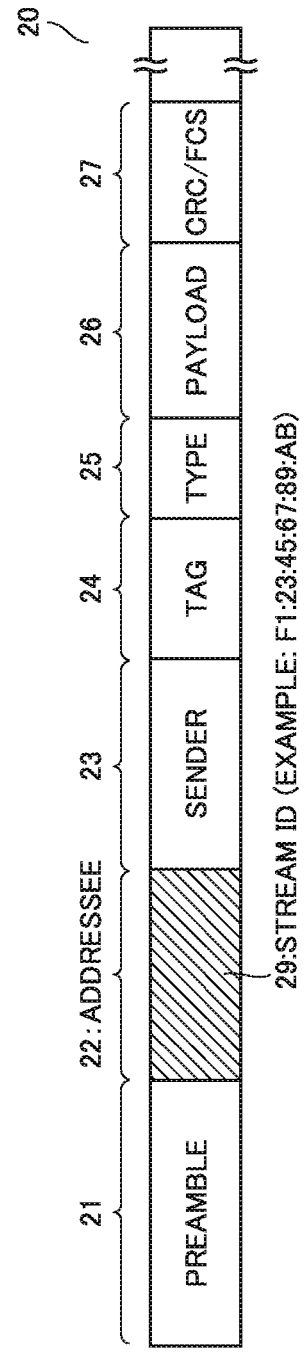
FIG. 4 is a diagram schematically showing an exemplary configuration of a communication frame 20 according to the present embodiment.
Figure 5:
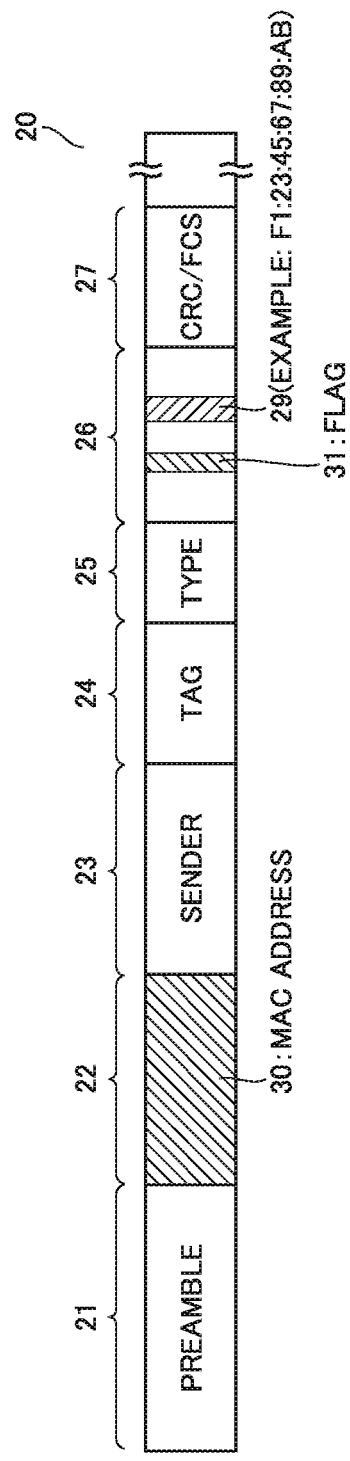
FIG. 5 is a diagram schematically showing an exemplary configuration of communication frame 20 according to the present embodiment.
Figure 6:
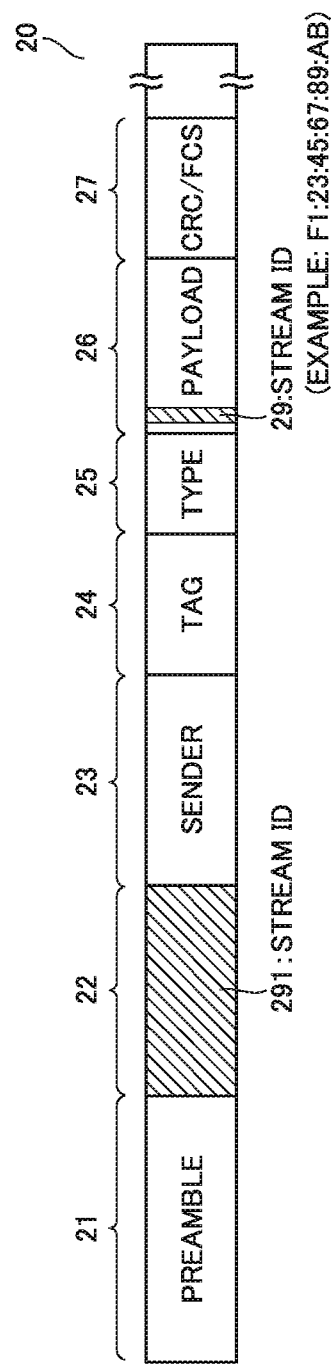
FIG. 6 is a diagram schematically showing an exemplary configuration of communication frame 20 according to the present embodiment.

FIGS. 4, 5, and 6 are each a diagram schematically showing an exemplary configuration of communication frame 20 according to the present embodiment. FIG. 4 shows exemplary basic communication frame 20 and FIGS. 5 and 6 each show exemplary communication frame 20 of resend request 9.

(d1. Basic Communication Frame)

Referring to FIG. 4, communication frame 20 exchanged between apparatuses basically includes an area 21 as a preamble area where a preamble is stored, an area 22 where an addressee of a frame is stored, an area 23 where a sender of a frame is stored, an area 24 for a tag, an area 25 where a type of a network is stored, and an area 27 for error correction, and further includes an area 26 where a payload which is a data main body to be transferred is stored. An addressee in area 22 and a sender in area 23 in communication frame 20 include information for uniquely identifying each apparatus, such as a media access control (MAC) address. In the case of basic communication frame 20 in FIG. 4, the payload includes, for example, input data 134 or 944 or output data 135 or 943 which is control-oriented data.

Figure 7:
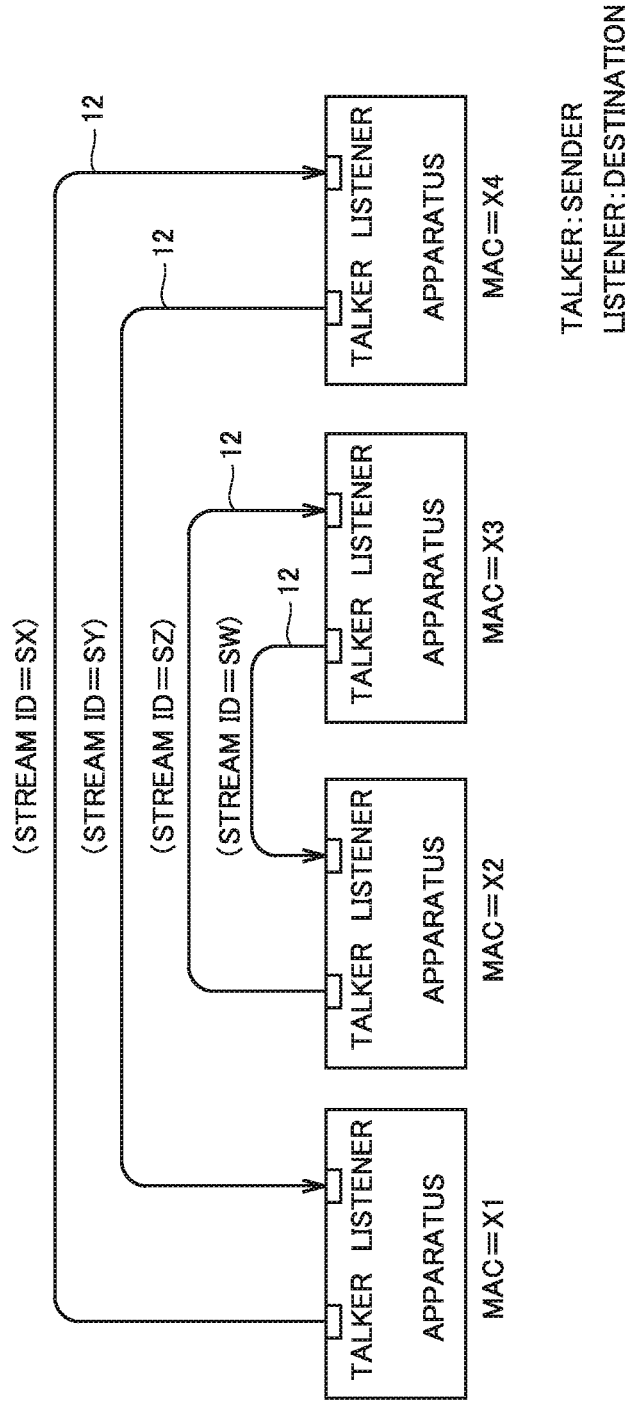
FIG. 7 is a diagram for illustrating a stream ID 29 according to the present embodiment.

Area 22 further includes a stream identifier (ID) 29 for managing transfer of communication frame 20. FIG. 7 is a diagram for illustrating stream ID 29 according to the present embodiment. In the present embodiment, communication frame 20 transferred over network 11 is managed in a unit of a flow 12. As shown in FIG. 7, an apparatus connected to network 11 can be a sender (TALKER) or a destination (LISTENER) of communication frame 20. A stream ID defined by a set of a MAC address of a sender apparatus which is TALKER and a MAC address of a destination apparatus which is LISTENER is allocated to each flow 12. Therefore, each apparatus can uniquely identify each exchanged communication frame 20 based on that stream ID 29.

(d2. Payload of Communication Frame 20)

For example, control-oriented data may be stored as the payload in area 26 of communication frame 20 in FIG. 4. Area 26 includes an area where a field value of control-oriented data is stored and an area where an instruction value or a control amount is stored.

When each field apparatus 90 reads data from area 26 or writes data in area 26, for example, it specifies a position within area 26 based on offset (for example, offset from the top of communication frame 20) individually allocated to that apparatus and reads data from and writes data into the specified position. Specifically, communication program 83 reads an instruction value or a control amount (input data 944 or output data 135) from a position based on offset of the field apparatus in area 26 of communication frame 20 that arrives, or writes a field value (output data 943 or input data 134) into a position based on offset in area 26 of communication frame 20 to be transmitted.

Offset information allocated to each field apparatus 90 has been stored in PLC 100. Therefore, PLC 100 can read a field value (output data 943 or input data 134) of each field apparatus 90 from area 26 of communication frame 20 that arrives based on this offset information, or can write an instruction value or a control amount (input data 944 or output data 135) into an offset position in each field apparatus 90 within area 26 of communication frame 20 to be transmitted based on this offset information.

PLC 100 can thus read or write control-oriented data of each field apparatus 90 from or into area 26 of communication frame 20, and each field apparatus 90 can read or write control-oriented data of the field apparatus from or into area 26 of communication frame 20.

(d3. Communication Frame for Resend Request 9)

Referring to FIG. 5, in a resend request frame which is communication frame 20 for transmitting resend request 9, for example, a MAC address of an apparatus which is a sender (TALKER) of resend request 9 is stored in area 23, a MAC address 30 of an apparatus which is a destination (LISTENER) of resend request 9 is stored in area 22, and the payload including a flag 31 representing resend request 9 and stream ID 29 of communication frame 20 resend of which is requested is stored in area 26. When the resend request frame in FIG. 5 is transmitted, only an apparatus having an address matching with MAC address 30 in area 22 can receive the resend request frame.

A configuration of the resend request frame is not limited to the configuration in FIG. 5, and for example, a destination of the resend request frame may be designated with a stream ID as in FIG. 6. Referring to FIG. 6, a MAC address of an apparatus as a sender of resend request 9 is stored in area 23 of the resend request frame, a stream ID 291 of the resend request frame is stored in area 22 of the addressee, and stream ID 29 of communication frame 20 resend of which is requested is stored in area 26. According to the configuration in FIG. 6, only an apparatus having an address matching with MAC address 30 of the destination (LISTENER) indicated by stream ID 291 in area 22 can receive the resend request frame.

<E. Connection Information Table>

FIG. 8 is a diagram schematically showing an exemplary configuration of connection information table 170 according to the present embodiment. Referring to FIG. 8, connection information table 170 included in PLC 100 includes port information 171 on the first port and port information 172 on the second port.

Port information 171 and port information 172 each include apparatus information 173 and able/unable-to-respond information 174. Apparatus information 173 includes a MAC address for identification of an each apparatus connected to network 11 connected to a corresponding communication port, in correspondence with that apparatus. In apparatus information 173, for example, MAC addresses are aligned sequentially from a MAC address of an apparatus which is closer to PLC 100 in position of connection to network 11. Able/unable-to-respond information 174 includes a MAC address which is an identifier of each apparatus without a function to respond to resend request 9 among apparatuses indicated in corresponding apparatus information 173. The MAC address in able/unable-to-respond information 174 may be a MAC address of each apparatus with a function to respond to resend request 9.

In the present embodiment, connection information table 86 included in field apparatus 90 is also configured similarly to connection information table 170 in FIG. 8. Therefore, description of connection information table 86 will not be repeated.

(e1. Schedule Information)

FIG. 9 is a diagram schematically showing exemplary schedule information 180 according to the present embodiment. Referring to FIG. 9, schedule information 180 includes for each stream of communication frame 20 of control-oriented data, a stream ID 183, arrival time 184 which is time of arrival of communication frame 20 in that stream to an apparatus, output synchronization 185, and a port ID 186 for identification of a communication port of arrival. Output synchronization 185 indicates whether or not data in communication frame 20 in that stream (for example, control-oriented data) is a synchronous processing target to be processed in synchronization with data in another communication frame 20 that arrives. Output synchronization 185 being set to "1" indicates that communication frame 20 in a corresponding stream is a synchronous processing target, and output synchronization being set to "0" indicates that communication frame 20 in a corresponding stream is not a synchronous processing target. Schedule information 180 may include MAC addresses of an apparatus as a sender and an apparatus as an addressee that define stream ID 183, in correspondence with stream ID 183 as shown in FIG. 9.

In the present embodiment, schedule information 87 included in field apparatus 90 is also configured similarly to schedule information 180 in FIG. 9. Therefore, description of schedule information 87 will not be repeated.

<F. Functional Configuration>

Figure 10:
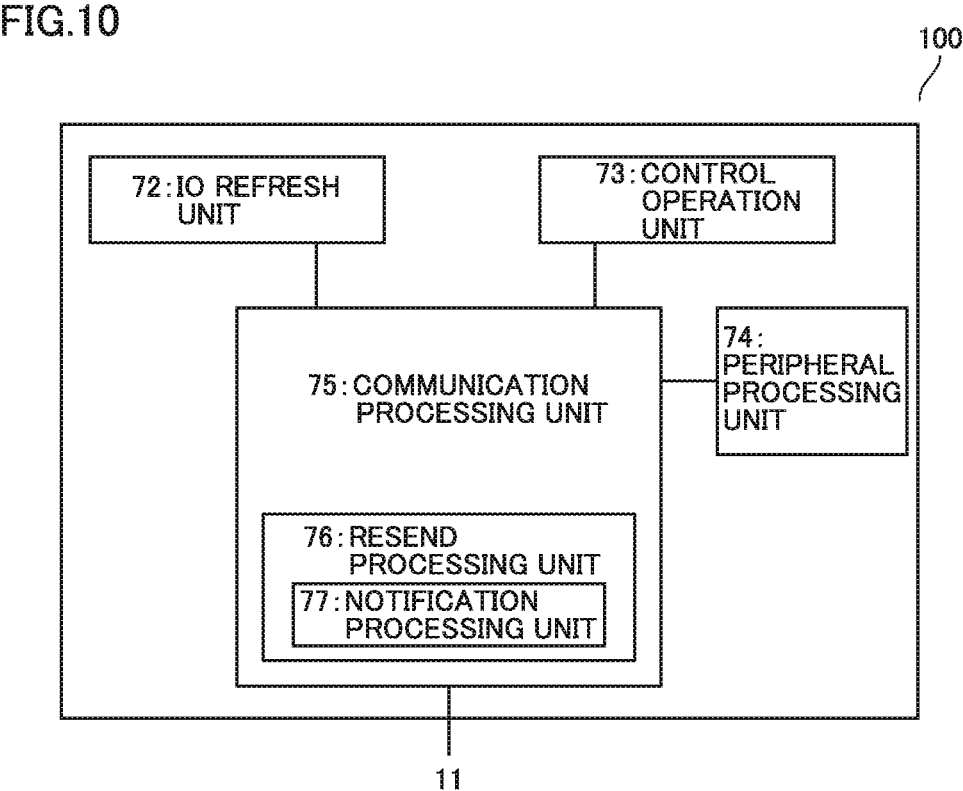
FIG. 10 is a diagram schematically showing a function of PLC 100 according to the present embodiment.

FIG. 10 is a diagram schematically showing a function of PLC 100 according to the present embodiment. FIG. 10 schematically shows a main function provided by execution by processor 112, of each program in PLC 100 shown in FIG. 2. Specifically, PLC 100 includes IO refreshing unit 72 provided by execution of IO refresh program 125, a control operation unit 73 provided by execution of user program 124, a peripheral processing unit 74 provided by execution of peripheral processing program 120, and a communication processing unit 75 provided by execution of communication program 127. Communication processing unit 75 includes a resend processing unit 76 provided by execution of resend program 128. Resend processing unit 76 includes a notification processing unit 77 provided by execution of notification program 129. Each processing unit is provided by execution by processor 112, of the program of that processing unit in cooperation with the OS of system program 122 and various libraries.

Figure 11:
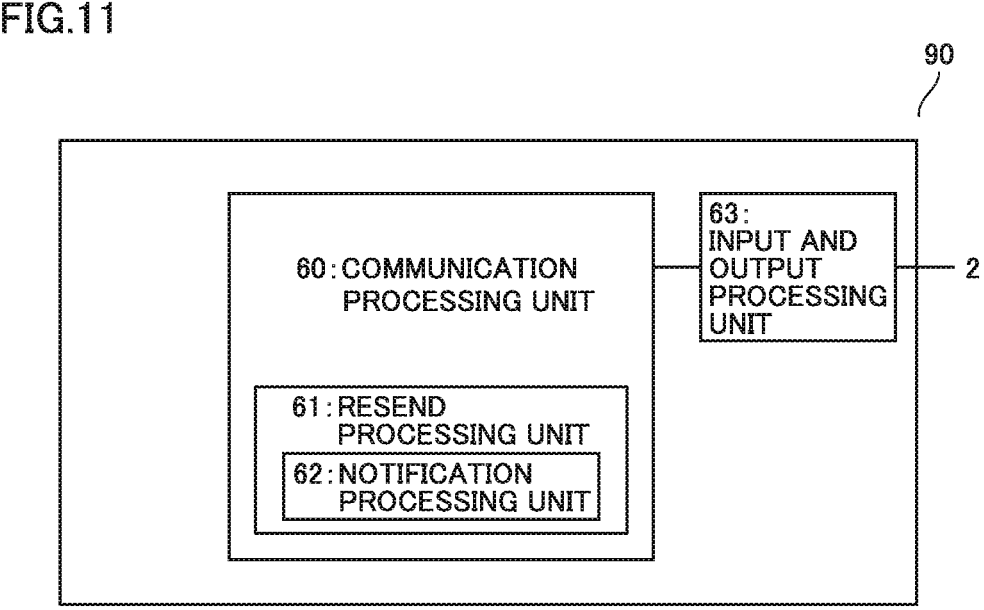
FIG. 11 is a diagram schematically showing a function of field apparatus 90 according to the present embodiment.

FIG. 11 is a diagram schematically showing a function of field apparatus 90 according to the present embodiment. FIG. 11 schematically shows a main function provided by execution by processor 91, of each program in field apparatus 90 shown in FIG. 3. Specifically, field apparatus 90 includes a communication processing unit 60 provided by execution of communication program 83 and an input and output processing unit 63 for input and output to and from an object to be controlled over network 2. Communication processing unit 60 includes a resend processing unit 61 provided by execution of resend program 84. Resend processing unit 61 includes a notification processing unit 62 provided by execution of a notification program 85. Input and output processing unit 63 is provided by execution of an input and output program for control of communication I/F 93 by system program 81. These processing units are provided by execution by processor 91, of the program for the processing unit in cooperation with the OS of system program 81 and various libraries.

<G Timing Chart in Control System 1>

Figure 12:
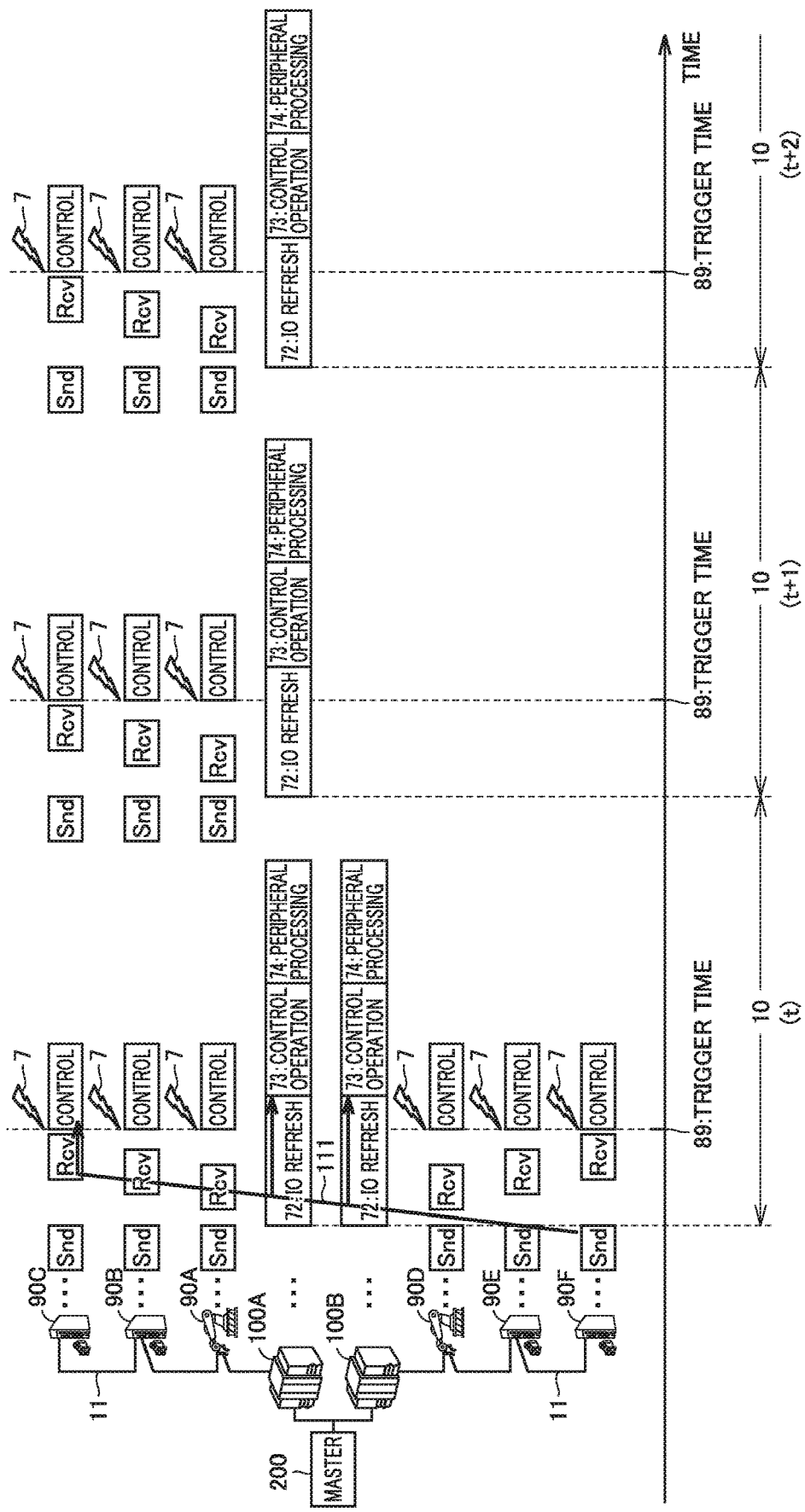
FIG. 12 is a diagram schematically showing an exemplary basic timing chart in control system 1 according to the present embodiment.

FIG. 12 is a diagram schematically showing an exemplary basic timing chart in control system 1 according to the present embodiment. With lapse of time shown on the abscissa of the timing chart, timing of start and end of processing including communication between PLCs 100A and 100B and each field apparatus 90 and a duration of performed processing are shown. The duration of performed processing is represented by a length of a band extending in a direction in which a time axis extends. Though three field apparatuses 90 are connected to each PLC 100 in FIG. 1, limitation to three connected field apparatus 90 is not intended.

Initially, in PLC 100, scheduler 123 makes scheduling such that IO refresh processing by IO refreshing unit 72 and control operation processing by control operation unit 73 requested to be completed within control cycle 10 are performed with the highest priority being placed thereon and then peripheral processing by peripheral processing unit 74 is performed with the second highest priority being placed thereon. Control cycle 10 is an exemplary time period shared between PLC 100 and field apparatus 90 in time synchronization with each other. The peripheral processing is lower in priority of execution than other processing. Therefore, when the control operation takes time, scheduler 123 may allow peripheral processing to be performed every N (N>2) control cycles 10.

In field apparatus 90, in control cycle 10, a trigger 7 is issued when trigger time 89 in common comes, and an object to be controlled is controlled in response to trigger 7. Specifically, field apparatus 90 controls an object to be controlled based on an instruction value or a control amount received from PLC 100 by means of IO refreshing unit 72 in control cycle 10.

Basically, in control cycle 10, at the end of control cycle 10, field apparatus 90 makes preparation for transmission ("Snd") of a field value to network 11. As IO refresh processing in next control cycle 10 is started, field apparatus 90 transmits communication frame 20 of the prepared field value over network 11 and PLC 100 receives (collects) communication frame 20 of the field value of each field apparatus 90 transferred over network 11. In control operation processing by control operation unit 73 in control cycle 10, PLC 100 performs the control operation based on the field value received in IO refresh processing in control cycle 10. PLC 100 transmits communication frame 20 of the instruction value or the control amount calculated in previous control cycle 10 over network 11 at the time of start of IO refresh processing in control cycle 10. Each field apparatus 90 can thus receive ("Rcv") communication frame 20 of the instruction value and the control amount transferred over network 11 at the time of start of IO refresh processing in control cycle 10, and controls an object to be controlled in response to trigger 7 based on the received instruction value or the control amount.

FIG. 12 shows that, when each field apparatus 90 prepares for transmission "Snd", (t)th (t=1, 2, 3, . . . ) control cycle 10 ends and (t+1)th control cycle 10 starts.

For example, FIG. 12 shows a sequence 111 of end-to-end (E2E). In sequence 111, for example, communication frame 20 transmitted from field apparatus 90F is transferred over the entire network 11 as being transferred in a direction of field apparatus 90F→field apparatus 90E→field apparatus 90D→PLC 100B→PLC 100A→field apparatus 90A→field apparatus 90B→field apparatus 90C. As each field apparatus 90 performs the sequence of E2E similar to that of field apparatus 90F, communication frames 20 for field values from all field apparatuses 90 are transferred over network 11.

PLC 100A and PLC 100B can thus each receive the field values from all field apparatuses 90 transferred over network 11 in IO refresh processing within a single control cycle 10 and can also receive a field value in communication frame 20 designated with a prescribed stream ID, that is, of at least one prescribed field apparatus 90.

Therefore, in control operation processing in control cycle 10, PLC 100A or PLC 100B can calculate an instruction value or a control amount based on field values of all field apparatuses 90 or can calculate an instruction value or a control amount based on a field value of at least one prescribed field apparatus 90. Thus, user program 124 for control operation processing based on the field value of field apparatus 90 may be arranged in any of PLC 100A and PLC 100B, and a degree of freedom in arranging user program 124 in control system 1 is enhanced.

Though E2E in sequence 111 is in a direction of field apparatus 90F→field apparatus 90C in FIG. 12, E2E may be in a reverse direction of field apparatus 90C→field apparatus 90F. In FIG. 12, field apparatus 90 and PLC 100 can arbitrarily set (modify) stream ID 29 of communication frame 20 in FIG. 4 based on a set of MAC addresses of field apparatuses 90 that configure E2E.

(g1. Transfer Processing by Field Apparatus 90)

In the present embodiment, in transfer of communication frame 20, communication processing unit 60 of field apparatus 90 performs transfer processing. Specifically, in transfer processing, communication processing unit 60 sets a MAC address of the field apparatus in area 23 of received communication frame 20 and sets a MAC address of an addressee apparatus based on connection information table 86 in area 22. Communication processing unit 60 detects the MAC address of an apparatus connected closest (field apparatus 90 or PLC 100) in apparatus information 173 corresponding to the communication port in connection information table 86 at which communication frame 20 is received, and sets the detected MAC address as the MAC address of the addressee apparatus.

At the end of control cycle 10, in transmission preparation "Snd" communication frame 20, communication processing unit 60 sets a field value from an object to be controlled accepted through input and output processing unit 63 in area 26 of communication frame 20. Thereafter, communication processing unit 60 controls communication circuit 94 to transmit communication frame 20 over network 11.

When communication processing unit 60 receives reception "Rcv" communication frame 20 exchanged at the beginning of control cycle 10, it reads a corresponding instruction value or control amount from area 26 of communication frame 20, provides the instruction value or the control amount to input and output processing unit 63, and controls communication circuit 94 to transmit communication frame 20 over network 11.

When field apparatus 90 determines that stream ID 29 of received communication frame 20 indicates the MAC address of the field apparatus, it transfers communication frame 20 to PLC 100 connected to the field apparatus.

(g2. Transfer Processing by PLC 100)

In the present embodiment, in transfer of communication frame 20, communication processing unit 75 of PLC 100 performs transfer processing. Specifically, when communication processing unit 75 receives communication frame 20 that arrives at PLC 100, it sets the MAC address of the PLC in area 23 of the sender and sets the MAC address of the addressee apparatus in area 22 of communication frame 20 based on connection information table 170. At this time, communication processing unit 75 detects the MAC address of the apparatus (field apparatus 90 or PLC 100) connected closest from apparatus information in connection information table 170, about apparatuses on the side of the communication port where communication frame 20 is received, and sets the detected MAC address as the MAC address of the addressee apparatus. Thereafter, communication processing unit 75 controls communication circuit 130 to transmit communication frame 20 over network 11.

When communication processing unit 75 receives transmission preparation "Snd" communication frame 20, it controls communication circuit 94 to transmit the communication frame over network 11. When reception "Rcv" communication frame 20 exchanged at the beginning of control cycle 10 arrives, communication processing unit 75 controls communication circuit 94 to transmit communication frame 20 over network 11.

In control cycle 10, transmission preparation "Snd" communication frame 20 and reception "Rcv" communication frame 20 which are communication frames 20 of control-oriented data are cyclically exchanged. Therefore, field apparatus 90 can predict a time point of arrival of communication frame 20 based on timer 99 in time synchronization and PLC 100 can predict a time point of arrival of communication frame 20 based on timer 101.

In transfer processing described above, communication frame 20 is transferred over network 11 and a copy thereof is temporarily stored in the buffer of each of communication circuits 130 and 94 in each apparatus. Communication frame 20 stored in the buffer can be held therein at least until IO refresh processing by IO refreshing unit 72 is performed in next control cycle 10.

<H. Case of Communication Abnormality>

Figure 13:
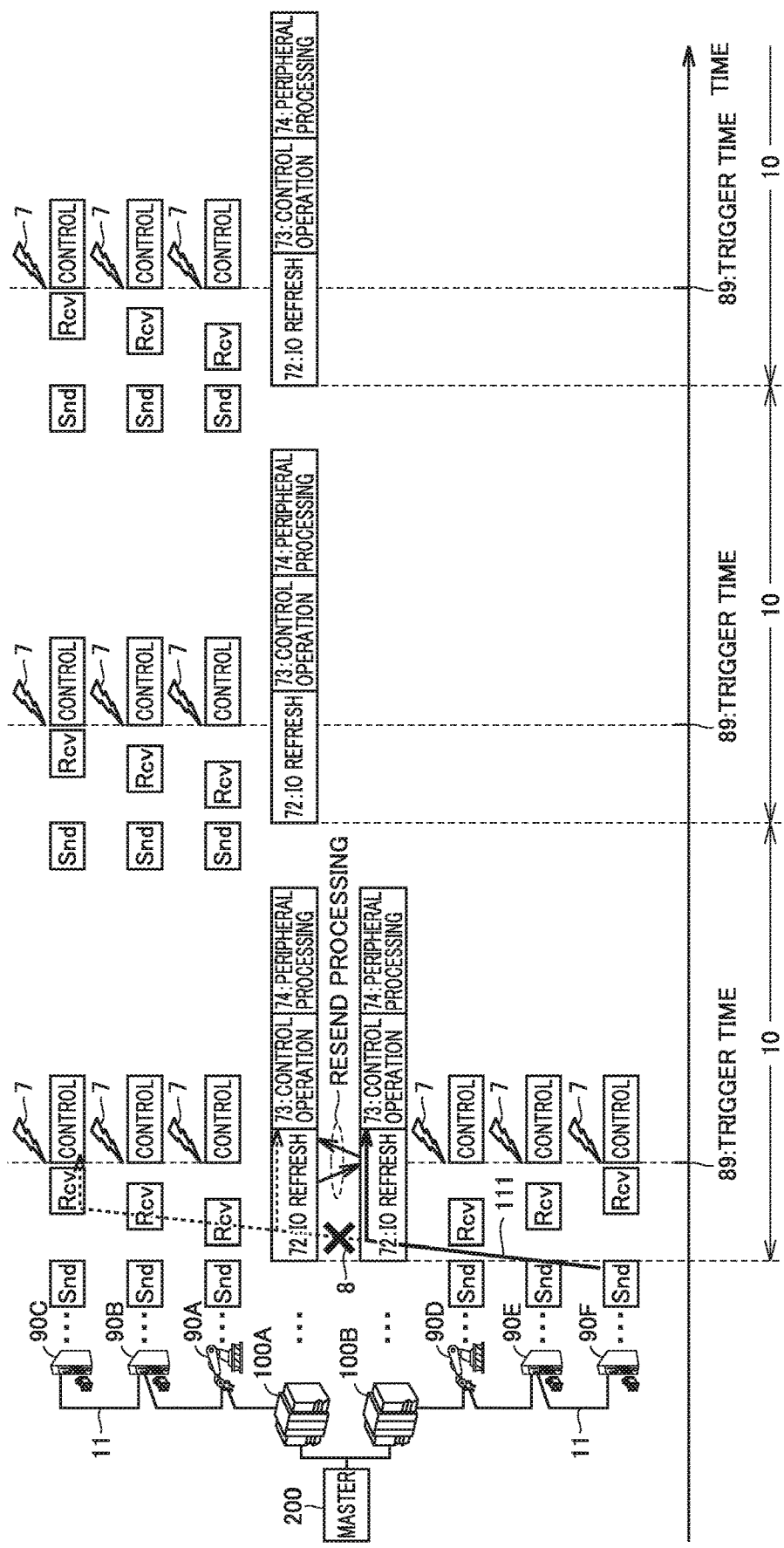
FIG. 13 is a diagram schematically showing an exemplary timing chart on the occurrence of communication abnormality in control system 1 according to the present embodiment.
Figure 14:
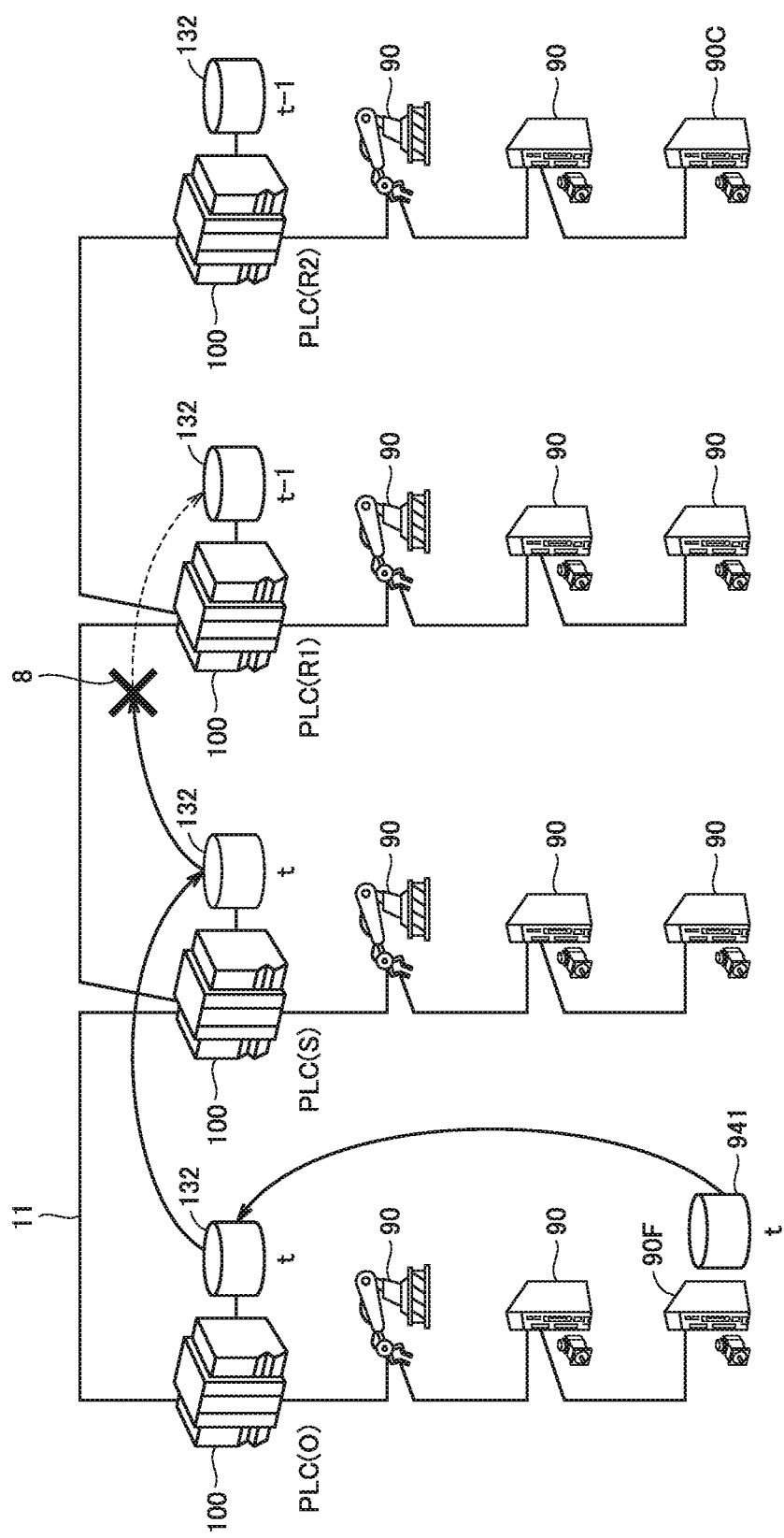
FIG. 14 is a diagram schematically showing a case in which sharing of data is difficult on the occurrence of communication abnormality according to the present embodiment.

FIG. 13 is a diagram schematically showing an exemplary timing chart on the occurrence of communication abnormality in control system 1 according to the present embodiment. FIG. 14 is a diagram schematically showing a case in which sharing of data is difficult on the occurrence of communication abnormality according to the present embodiment.

In FIG. 12, as sequence 111 is performed, PLC 100A and PLC 100B can share control-oriented data represented as a field value. In contrast, when communication abnormality such as frame loss 8 occurs somewhere in sequence 111 of communication, for example, on network 11 between PLC 100A and PLC 100B as in FIG. 13, it is difficult to share data at the timing when each PLC 100 performs the control operation, and an appropriate instruction value or control amount may not be calculated. FIG. 14 shows a specific example of this case. In FIG. 14, for example, a plurality of PLCs 100 are connected in a daisy chain to exchange data with one another over network 11. Each PLC 100 is connected to at least one field apparatus 90 in the daisy chain over network 11. In FIG. 14, the plurality of PLCs 100 are distinguished as a PLC(O) connected to field apparatus 90F, a PLC(S), a PLC(R1), and a PLC(R2) connected to field apparatus 90C.

In FIG. 14, when sequence 111 of E2E in FIG. 12 is performed, without communication abnormality, in IO refresh processing by IO refreshing unit 72 in one control cycle 10, communication frame 20 from field apparatus 90F arrives at field apparatus 90C through all apparatuses on network 11. In contrast, for example, it is assumed that frame loss 8 occurs in transfer between the PLC(S) and the PLC(R1) in IO refresh processing by IO refreshing unit 72 in t-th control cycle 10. In this case, communication frames 20 held in buffer 941 of field apparatus 90F, buffer 132 of the PLC(O), and buffer 132 of the PLC(S) are control-oriented data in t-th control cycle 10, whereas communication frames 20 held in buffers 132 of the PLC(R1) and the PLC(R2) at which communication frame 20 has not yet arrived due to frame loss 8 remain as in previous control cycle 10 (t−1-th control cycle 10). Therefore, data cannot be shared at the timing when each PLC performs the control operation after IO refresh processing, and it is difficult to calculate an appropriate instruction value or control amount.

<I. Resend Processing>

When communication abnormality such as frame loss 8 occurs and PLC 100 detects the fact that communication frame 20 does not arrive at defined time, for example, within a certain time period after start of control cycle 10 (that is, after start of IO refresh processing by IO refreshing unit 72), resend processing unit 76 performs resend processing. Resend processing unit 76 transmits over network 11, a resend request frame including resend request 9 that requests for resend of communication frame 20 that does not arrive.

Whether or not communication frame 20 has arrived is determined based on arrival time 184 in schedule information 180. Specifically, in each control cycle 10, each PLC 100 determines arrival time 184 based on timer 160 for each stream ID 29 in incoming communication frame 20, and has determined arrival time 184 stored in schedule information 180. In other words, since communication frame 20 of control-oriented data is cyclically transferred in synchronization with control cycle 10, it can be predicted that communication frame 20 of control-oriented data will probably arrive at PLC 100 within a certain time period after start of control cycle 10. Therefore, PLC 100 detects a communication port where communication frame 20 that will arrive within this certain time period arrives based on timer 160, and determines arrival time 184. Information on the detected communication port and determined arrival time 184 are set as port ID 186 and arrival time 184 for each stream ID 183 in schedule information 180. In schedule information 180, the communication port where communication frame 20 of control-oriented data will arrive can thus be set for each stream ID 183 and arrival time 184 can be maintained at a latest value.

Figure 15:
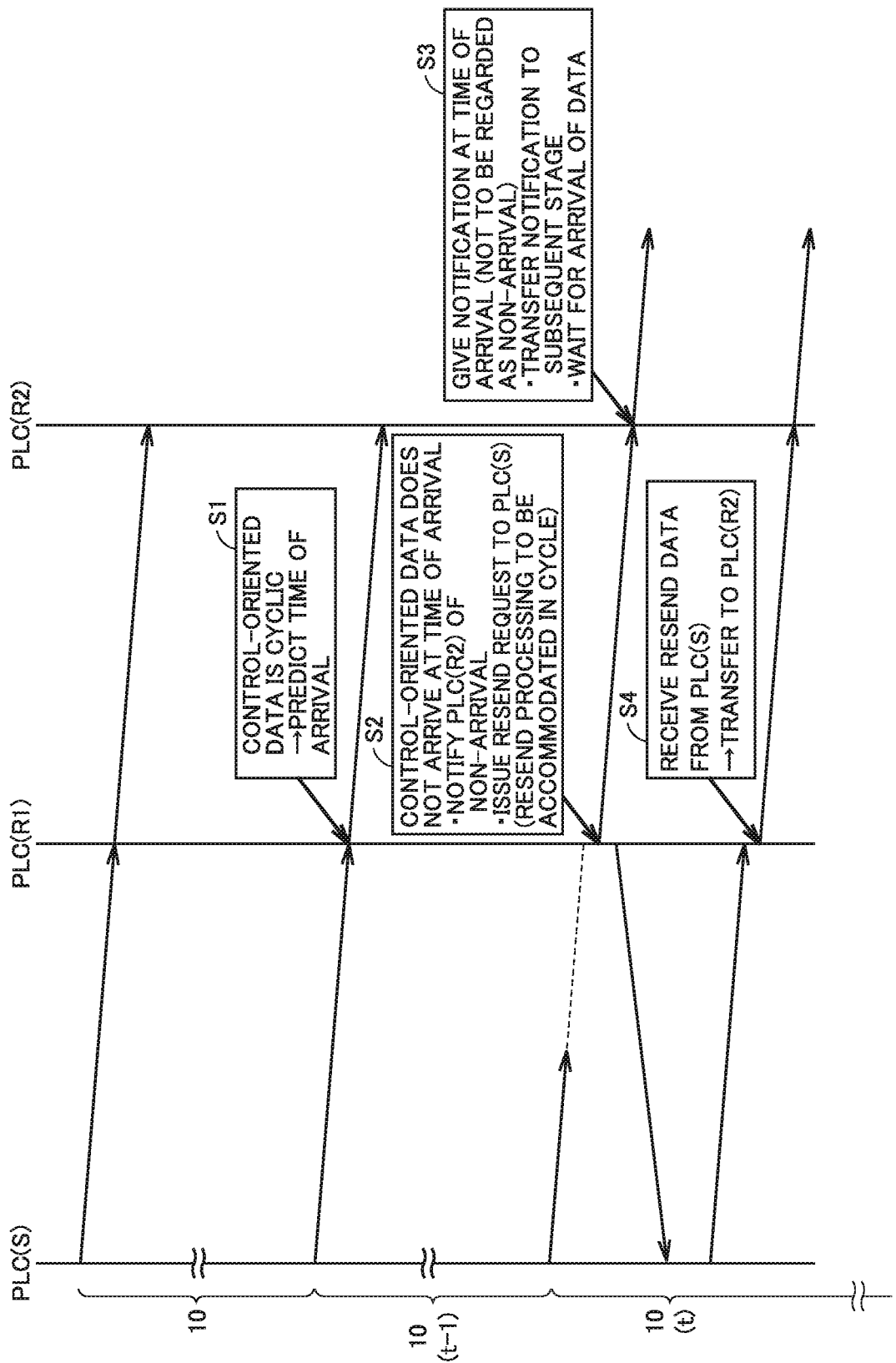
FIG. 15 is a diagram schematically showing an exemplary communication sequence in resend processing according to the present embodiment.

FIG. 15 is a diagram schematically showing an exemplary communication sequence in resend processing according to the present embodiment. Referring to FIG. 15, resend processing in the case in FIG. 14 will be described. Initially, resend processing unit 76 of the PLC(R1) predicts time of arrival of communication frame 20 of control-oriented data as described above, for example, every control cycle 10, and updates corresponding arrival time 184 for each stream ID 183 in schedule information 180 (step S1).

Resend processing unit 76 of the PLC(R1) compares stream ID 183 in schedule information 180 with stream ID 29 in communication frame 20 that will arrive within a certain time period after start of (t)th control cycle 10, and detects presence of communication frame 20 with a stream ID that has not arrived within the certain time period based on a result of comparison (step S2). In other words, among stream IDs 183, presence of stream ID 183, communication frame 20 corresponding to which has not arrived within the certain time period, is detected. In step S2, resend processing unit 76 generates the resend request frame in FIG. 5 or 6 and transmits the resend request frame over network 11 through communication circuit 130. In step S2, notification processing unit 77 generates communication frame 20 in which non-arrival notification 6 is stored and transmits the communication frame over network 11 through communication circuit 130. In resend processing, resend request 9 is transmitted when a condition involved with control cycle 10 is satisfied. Contents of the resend request frame transmitted in step S2, transmission of non-arrival notification 6, and resend processing based on the condition will be described later in detail.

In FIG. 15, non-arrival notification 6 is transmitted to the PLC(R2). When resend processing unit 76 of the PLC(R2) receives non-arrival notification 6, it transfers non-arrival notification 6 to another PLC 100 connected to the PLC(R2) (step S3). Such another PLC 100 is also called a "subsequent-stage PLC." The PLC(R2) and subsequent-stage PLC 100 can thus expect arrival of control-oriented data and can wait for arrival.

Within (t)th control cycle 10, the PLC(S) is defined as an apparatus that receives resend request 9. When resend processing unit 76 of the PLC(S) receives resend request 9, it transmits over network 11 through communication circuit 130, communication frame 20 matching with a stream ID that has not yet arrived and is designated in the resend request frame among communication frames 20 held in buffer 132 (step S4). Communication frame 20 in response to resend request 9 is thus sent again to the PLC(R1) that has issued the request.

When the PLC(R1) receives re-sent communication frame 20, it performs transfer processing for transmitting received communication frame 20 to the PLC(R2). The PLC(R2) which is the subsequent-stage PLC that has received non-arrival notification 6 can thus receive communication frame 20 of control-oriented data that has not arrived.

(i1. Generation of Resend Request Frame)

A resend request frame transmitted in step S2 will be described. When the resend request frame is generated in a form in FIG. 5, resend processing unit 76 has the MAC address of the PLC(R1) which is the sender of resend request 9 stored in area 23. The MAC address of an apparatus connected closest to the PLC(R1) is set as the MAC address of the addressee apparatus in area 22. Specifically, resend processing unit 76 specifies the MAC address of the apparatus connected closest to the PLC(R1), in port information 171 (or 172) on the communication port specified by port ID 186 corresponding to stream ID 183 that has not yet arrived. In this case, the MAC address of the PLC(S) is specified. Flag 31 for resend request 9 and stream ID 183 non-arrival of which is detected in step S2 are stored in area 26.

When resend processing unit 76 generates the resend request frame in the form in FIG. 6, resend processing unit 76 has the MAC address of the apparatus which is the sender of resend request 9 stored in area 23, has stream ID 291 of the resend request frame stored in area 22 of the addressee, and has stream ID 29 (stream ID 183 that has not yet arrived) of communication frame 20 resend of which is requested stored in area 26.

(i2. Resend Processing Based on Condition)

Figure 16:
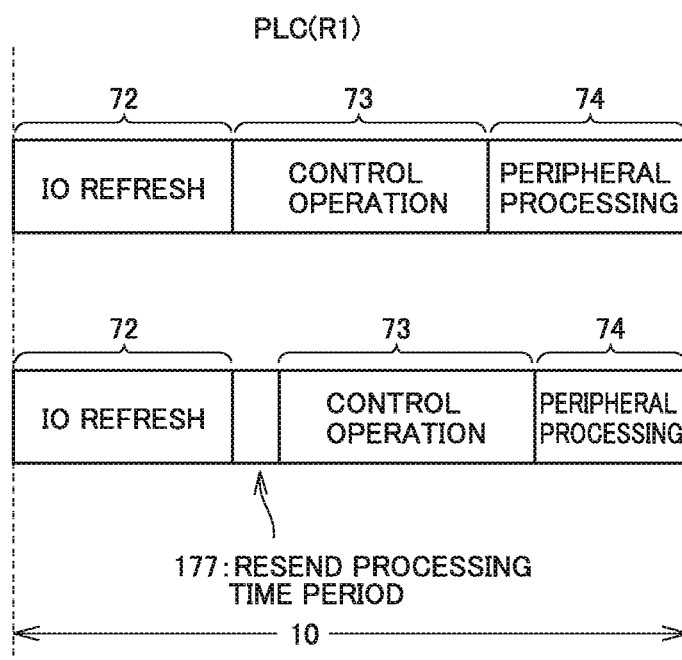
FIG. 16 is a schematic diagram illustrating a condition for performing resend processing according to the present embodiment.

FIG. 16 is a schematic diagram illustrating a condition for performing resend processing according to the present embodiment. In the present embodiment, when relation between a resend processing time period 177 and an allowance time within control cycle 10 satisfies a condition (resend processing time period 177<allowance time), resend processing unit 76 determines to perform resend processing. Therefore, resend processing unit 76 can also determine not to perform resend processing when the condition is not satisfied.

The allowance time is calculated as the allowance time= (duration of control cycle 10–time period required for processing (TO refresh processing, control operation processing, etc.) necessary for control). Processing necessary for control does not include processing in connection with a user program allocated to a task of low priority or the peripheral processing program and information-oriented processing. Resend processing time period 177 refers to a response time period required until reception of response to resend request 9, and it is calculated as resend processing time period 177=(time period for communication of resend request 9 to the PLC(S)+time period for resend processing within the PLC(S)+communication time period for resend in the PLC(S)). The time period for communication of resend request 9 and the communication time period for resend are calculated based on (size of communication frame 20/ (communication band)+cable delay time). The time period for resend processing within the PLC(S) refers to a time period for preparation for transmission (data reading, data copying, etc.) for control-oriented data resend request 9 for which has been received.

The response time period is more preferably calculated for each apparatus based on configuration 88 thereof. In other words, the response time period is dependent on a distance of communication of information resend request 9. Therefore, resend processing unit 76 determines whether or not there is an apparatus for which able/unable-to-respond information 174 indicates "unable to respond" in a path for transfer of resend request 9 or the number of such apparatuses based on connection information table 170 in configuration 88, and changes a parameter value involved with the communication time period for calculating resend processing time period 177 based on a result of determination. Each apparatus can thus more accurately calculate resend processing time period 177 based on connection information table 170 specific to each apparatus.

(i3. Flowchart of Resend Processing)

Figure 17:
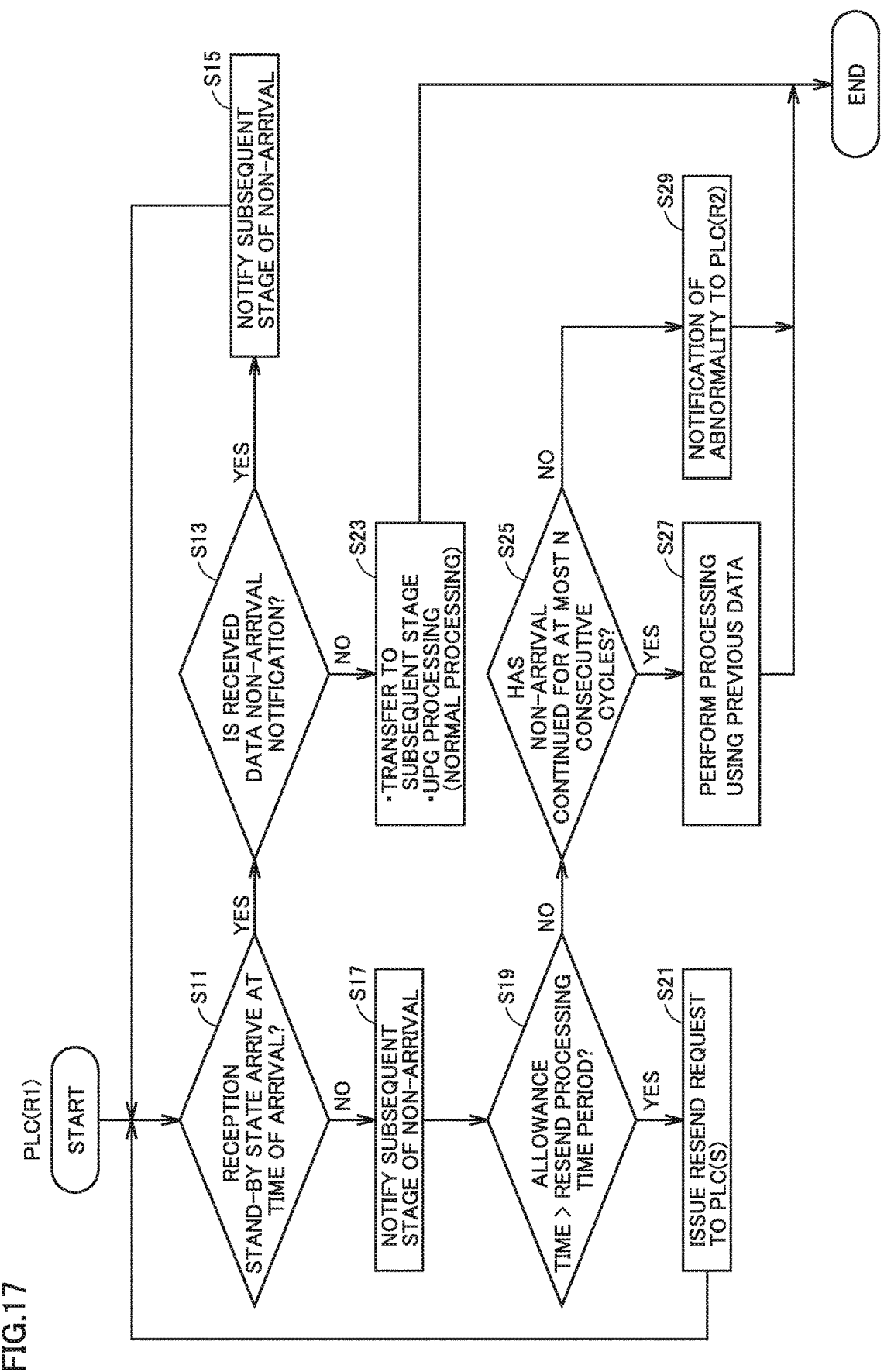
FIG. 17 is a flowchart showing exemplary resend processing according to the present embodiment.

FIG. 17 is a flowchart showing exemplary resend processing according to the present embodiment. Resend processing by resend processing unit 76 of the PLC(R1) in FIG. 14 will be described with reference to FIG. 17. Initially, resend processing unit 76 determines whether or not communication frame 20 including stream ID 183 registered in schedule information 180 arrives at corresponding arrival time 184 (step S11). When resend processing unit 76 determines that communication frame 20 including stream ID 183 arrives at corresponding arrival time 184 (YES in step S11), resend processing unit 76 determines whether or not received communication frame 20 is communication frame 20 for non-arrival notification 6 (step S13). When resend processing unit 76 determines that it has received communication frame 20 for non-arrival notification 6 (YES in step S13), notification processing unit 77 transmits communication frame 20 for non-arrival notification 6 to the subsequent-stage PLC (step S15). Thereafter, the process returns to step S11. When non-arrival notification 6 is received in step S15, resend processing unit 76 can determine not to transmit resend request 9.

When resend processing unit 76 determines that received communication frame 20 is not communication frame 20 for non-arrival notification 6 (NO in step S13), control operation unit 73 performs control operation processing based on data (that is, control-oriented data) in received communication frame 20 (step S23).

When resend processing unit 76 determines in step S11 that communication frame 20 including stream ID 183 does not arrive at corresponding arrival time 184, that is, non-arrival (NO in step S11), notification processing unit 77 transmits communication frame 20 for non-arrival notification 6 to the subsequent-stage PLC (step S17).

Resend processing unit 76 determines whether or not a condition for performing resend processing (allowance time>resend processing time period 177) is satisfied (step S19), and when it determines that the condition is satisfied (YES in step S19), it transmits communication frame 20 for resend request 9 (step S21). Thereafter, the process returns to step S11.

When resend processing unit 76 determines that the condition for performing resend processing is not satisfied (NO in step S19), it determines whether or not determination as non-arrival has consecutively been made over at most N (N>2) control cycles (step S25). When resend processing unit 76 determines that determination as non-arrival has been made consecutively over at most N (N>2) control cycles 10 (YES in step S25), control operation unit 73 of the PLC(R1) performs the control operation based on control-oriented data in latest control cycle 10 among data in communication frames 20 accumulated in storage unit 14, and calculates the instruction value or the control amount (step S27). When resend processing unit 76 determines that determination as non-arrival has been made consecutively over more than N (N>2) control cycles 10 (NO in step S25), it transmits an abnormality notification to the subsequent-stage PLC (the PLC(R2)) (step S29). When the subsequent-stage PLC receives the abnormality notification after reception of non-arrival notification 6, it performs prescribed processing for addressing abnormality. For example, the subsequent-stage PLC performs processing as in step S27.

A value for a variable N in step S25 can be determined, for example, depending on characteristics of an object to be controlled connected to the PLC(R1). In step S27, PLC 100 may determine the instruction value or the control amount (output data 135 in storage unit 114) already calculated in the previous control cycle as control-oriented data calculated in present control cycle 10, instead of performing the control operation based on control-oriented data in the previous control cycle.

(i4. Specific Exemplary Condition for Performing Resend Processing)

Figure 18:
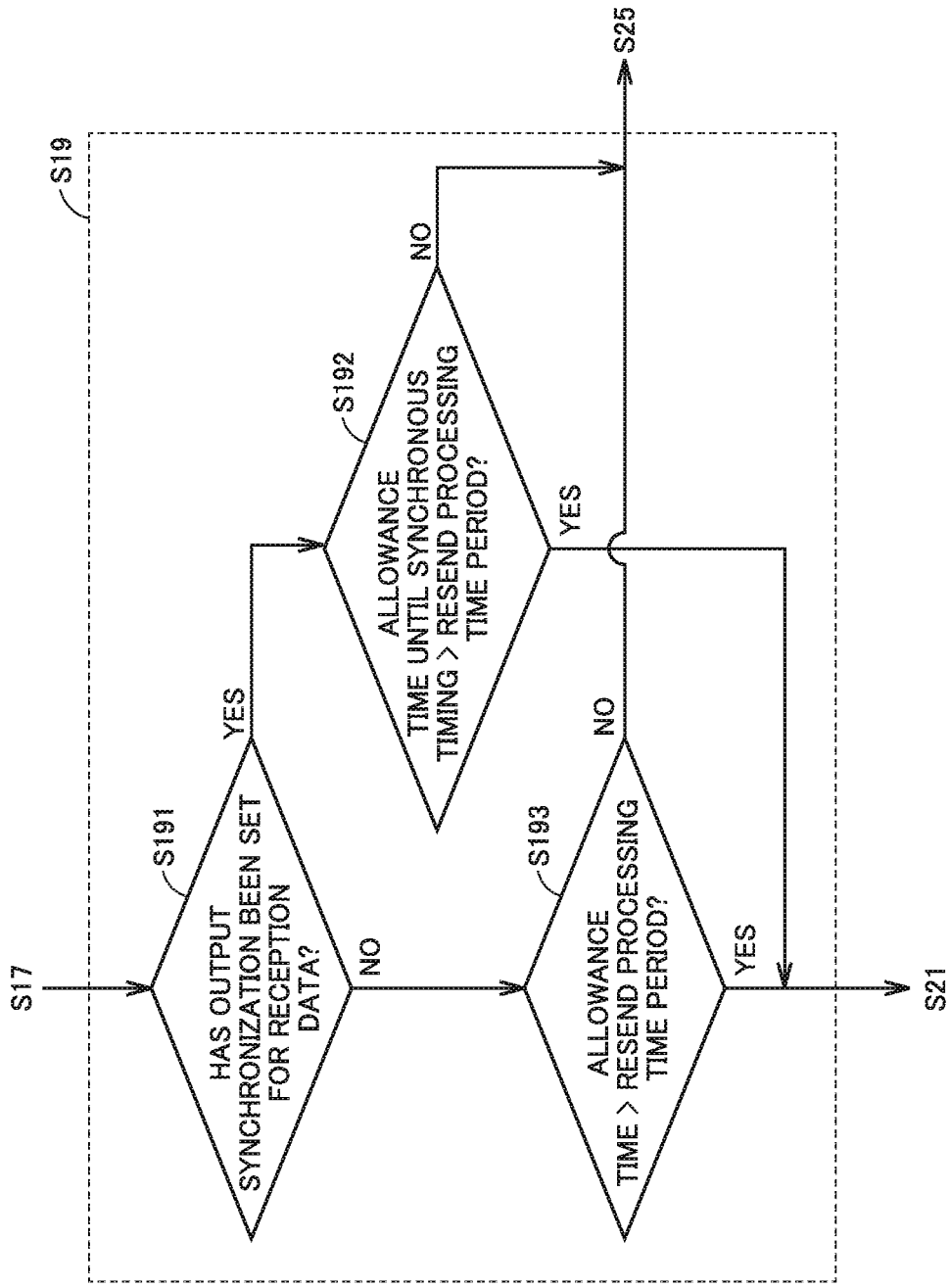
FIG. 18 is a flowchart showing exemplary processing in step S19 in FIG. 17.

FIG. 18 is a flowchart showing exemplary processing in step S19 in FIG. 17. Details of determination (step S19) as to the condition for performing resend processing will be described with reference to FIG. 18. Initially, resend processing unit 76 determines whether or not output synchronization 185 of stream ID 183 determined as not having arrived has been set, that is, whether or not stream ID 183 indicates "1" (step S191).

When resend processing unit 76 determines that output synchronization 185 has been set (YES in step S191), resend processing unit 76 determines whether or not the condition (allowance time until synchronous timing>resend processing time period 177) is satisfied (step S192). When resend processing unit 76 determines that the condition is not satisfied (NO in step S192), it does not transmit resend request 9 and the process makes transition to step S25. When resend processing unit 76 determines that the condition has been satisfied (YES in step S192), it transmits resend request 9 (step S21).

When the process returns to step S191 and resend processing unit 76 determines that output synchronization 185 corresponding to stream ID 183 that has not arrived has not been set, that is, the stream ID indicates "0" (NO in step S191), resend processing unit 76 determines whether or not the condition (allowance time>resend processing time period 177) is satisfied (step S193), and when the condition is satisfied (YES in step S193), the process makes transition to step S21, and when the condition is not satisfied (NO in step S193), the process makes transition to step S25.

Though setting is dynamically made in step S191 such that output synchronization 185 is different for each stream ID 183 that has not arrived, setting may statically be made to determine in advance whether or not to set output synchronization for each PLC 100.

When data for which output synchronization should be set has not arrived, the "allowance time until synchronous timing" set as the condition in step S192 may be calculated as (time of output synchronization−time of detection of non-arrival), and when communication frame 20 corresponding to the stream ID that has not arrived is received, it may be calculated as (time of output synchronization−time of reception of frame that has not arrived). Time of output synchronization corresponds to predetermined time of output of trigger 7.

<J. Resend Processing by Field Apparatus 90>

Figure 19:
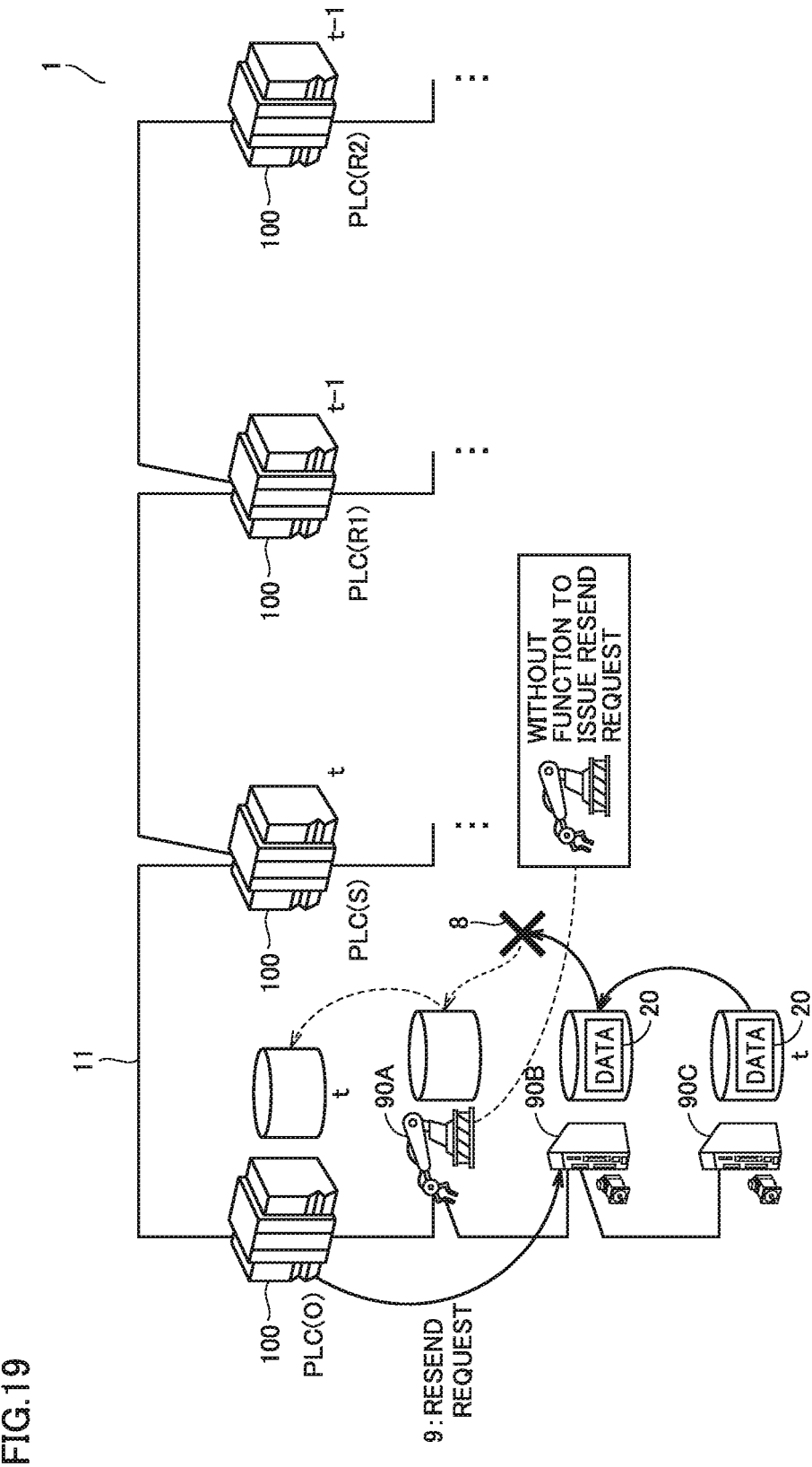
FIG. 19 is a diagram schematically showing exemplary resend processing by field apparatus 90 according to the present embodiment.

In the present embodiment, both of PLC 100 and field apparatus 90 can perform resend processing. Resend processing by PLC 100 described above can similarly be performed by resend processing unit 61 of field apparatus 90. FIG. 19 is a diagram schematically showing exemplary resend processing by field apparatus 90 according to the present embodiment.

In FIG. 19, in a case in which field apparatus 90A does not include resend processing unit 61, frame loss 8 occurs during transfer of communication frame 20 from field apparatus 90C to the PLC(O). Therefore, communication frame 20 does not arrive at field apparatus 90A and the PLC(O). Since field apparatus 90A does not include resend processing unit 61, it does not transmit resend request 9, however, the PLC(O) transmits resend request 9.

In this case, resend processing unit 76 of the PLC(O) transmits resend request 9 to an apparatus located closest (in FIG. 19, field apparatus 90B) among apparatuses not falling under able/unable-to-respond information 174, that is, among apparatuses including resend processing unit 61, in port information 171 (or 172) specified by port ID 186 corresponding to stream ID 183 that has not arrived. When resend processing unit 61 of field apparatus 90B receives resend request 9, it performs re-transmission of communication frame 20 corresponding to stream ID 183 that has been requested. Field apparatus 90A and the PLC(O) can thus receive communication frame 20 that has not arrived.

<K. Advantage>

Figure 20:
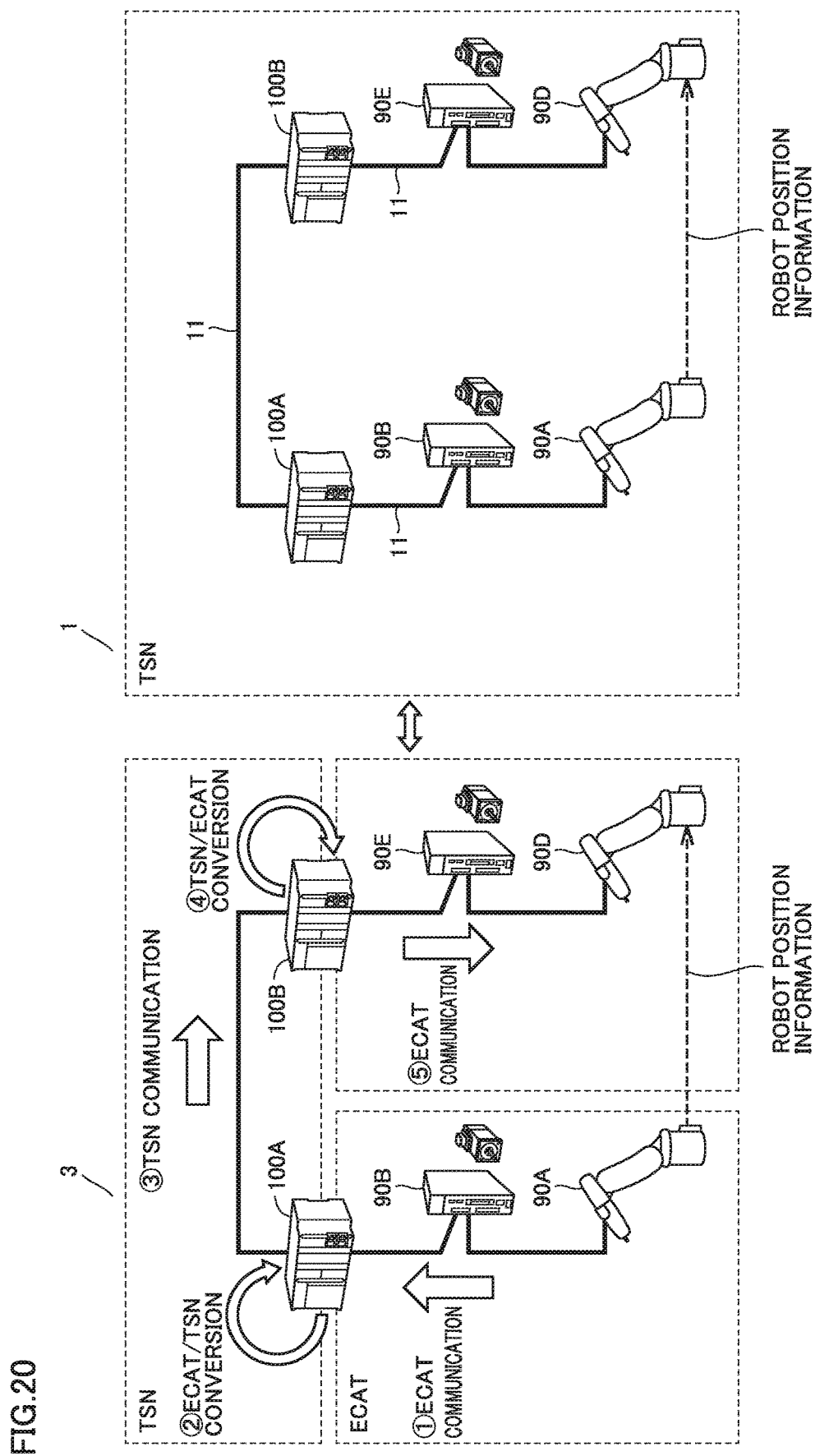
FIG. 20 is a diagram showing the configuration of control system 1 according to the present embodiment in comparison with another configuration.

FIG. 20 is a diagram showing the configuration of control system 1 according to the present embodiment in comparison with another configuration. An advantage achieved by control system 1 will be described with reference to FIG. 20. FIG. 20 shows control system 1 using one identical protocol (for example, TSN) for communication among apparatuses and a control system 3 using a plurality of types of protocols (for example, TSN and EtherCAT®) for communication among apparatuses. In control system 3, TSN is used for communication between PLCs 100 and EtherCAT® (abbreviated as ECAT in the figure) is used for communication between PLC 100 and field apparatus 90 and between field apparatuses 90.

In FIG. 20, in a case in which a frame including information on a position of a robot representing an exemplary field value is transmitted from field apparatus 90A to field apparatus 90D by E2E, an identical protocol is used in control system 1, and hence conversion of the protocol is not required in transfer of the frame from a communication layer between field apparatuses to a communication layer between PLCs 100. In contrast, in control system 3, (2) and (4) protocol conversion in a communication path should be performed in such a manner as (1) ECAT communication→(2) ECAT/TSN protocol conversion→(3) TSN communication→(4) TSN/ECAT protocol conversion→(5) ECAT communication.

Thus, in control system 1, apparatuses can share data with one another without requiring protocol conversion even for communication across layers. Since control system 1 does not require protocol conversion, communication between layers can be faster in control system 1 than in control system 3. Therefore, the apparatuses provided in control system 1 can share data with one another within a relatively short communication cycle, for example, a cycle of IO refresh processing within control cycle 10. Since PLC 100 can thus obtain all values (field values) to be operated prior to start of control operation processing by user program 124, user program 124 can also be designed without taking communication delay into account.

Though communication frame 20 of control-oriented data and communication frame 20 of non-control-oriented data (information-oriented and control information-oriented) are transferred over network 11, resend request 9 is transmitted only for communication frame 20 of control-oriented data. Therefore, since resend request 9 only for control-oriented data, cyclic arrival of which should be guaranteed, is transmitted, consumption of a communication band in network 11 can be suppressed even though resend request 9 is transmitted.

<L. Additional Aspects>

The embodiment described above includes technical concepts as below.

[Configuration 1]

A control system (1) in which a plurality of apparatuses (100, 90) in time synchronization with one another are connected to a network (11), wherein the network is configured to transfer a frame (20) periodically exchanged by the plurality of apparatuses, the plurality of apparatuses include at least one control device (100) and an apparatus (90) controlled by the control device, each of the plurality of apparatuses is connected over the network, to a first apparatus configured to transmit a frame that arrives at each of the plurality of apparatuses and a second apparatus configured to receive a frame transmitted from each of the plurality of apparatuses, each of the apparatuses includes information on a frame transfer path (170, 86) and transfer timing (180, 87) based on synchronous time, and when a frame does not arrive at defined time through the transfer path and when a condition associated with a cycle (10) is satisfied, at least one of the plurality of apparatuses is configured to transmit a resend request (9) through the transfer path.

[Configuration 2]

The control system described in Configuration 1, wherein the cycle includes a time period for exchange of the frame by the plurality of apparatuses and a time period for a control operation performed by the at least one control device based on data in the exchanged frame, and the condition includes a condition based on an allowance time calculated by subtracting the time period for exchange of the frame and the time period for the control operation from the cycle and a time period for response to the resend request.

[Configuration 3]

The control system described in Configuration 2, wherein when the condition associated with the cycle is not satisfied, the at least one control device is configured to perform the control operation based on data in a frame that arrived in a previous cycle or to use a value calculated in the previous cycle for control.

[Configuration 4]

The control system described in any one of Configurations 1 to 3, wherein when the at least one apparatus transfers the resend request to the first apparatus over the network, the at least one apparatus is configured to transfer a frame non-arrival notification to the second apparatus over the network.

[Configuration 5]

The control system described in any one of Configurations 1 to 4, wherein the frame transferred by the network includes a frame of control-oriented data used for the control and a frame of non-control-oriented data, and the at least one apparatus is configured to transmit the resend request only for the frame of the control-oriented data, of the frame of the control-oriented data and the frame of the non-control-oriented data.

[Configuration 6]

The control system described in any one of Configurations 1 to 5, wherein the at least one apparatus is connected to a plurality of the first apparatuses over the network, and the at least one apparatus includes a resend processing module (76, 61) configured to detect an apparatus capable of responding to the resend request among the plurality of first apparatuses and to transmit the resend request to the detected apparatus.

[Configuration 7]

The control system described in any one of Configurations 1 to 6, wherein a protocol for network communication between the control devices and a protocol for network communication between the control device and the controlled apparatus are identical.

[Configuration 8]

An apparatus (100, 90) provided in a control system (1), wherein the control system includes a plurality of the apparatuses connected to a network (11) and being in time synchronization with one another, the network is configured to transfer a frame (20) periodically exchanged by the plurality of apparatuses, the apparatus is connected over the network, to a first apparatus configured to transmit a frame that arrives at the apparatus and a second apparatus configured to receive a frame transmitted from the apparatus, the apparatus includes information on a frame transfer path (170, 86) and transfer timing (180, 87) based on synchronous time, and when a frame does not arrive at defined time through the transfer path and when a condition associated with a cycle is satisfied, the apparatus is configured to transmit a resend request (9) through the transfer path.

[Configuration 9]

A method of controlling communication by an apparatus (100, 90) included in a control system (1), the control system including a plurality of the apparatuses connected to a network (11) and being in time synchronization with one another, the network being configured to transfer a frame (20) periodically exchanged by the plurality of apparatuses, the apparatus being connected over the network, to a first apparatus configured to transmit a frame that arrives at the apparatus and a second apparatus configured to receive a frame transmitted from the apparatus, the apparatus including information on a frame transfer path (170, 86) and transfer timing (180, 87) based on synchronous time, the method comprising:

receiving a frame that arrives at the apparatus over the network;

detecting whether the frame arrives at the apparatus at defined time through the transfer path; and transmitting, when the frame does not arrive and when a condition associated with a cycle (10) is satisfied, a resend request (9) through the transfer path.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1, 3 control system; 2, 11 network; 6 non-arrival notification; 7 trigger; 8 frame loss; 9 resend request; 10 control cycle; 111 sequence; 12 flow; 20 communication frame; 21, 22, 23, 24, 25, 26, 27 area; 29, 291, 183 stream ID; 30 MAC address; 31 flag; 60, 75 communication processing unit; 61, 76 resend processing unit; 62, 77 notification processing unit; 63 input and output processing unit; 72 IO refreshing unit; 73 control operation unit; 74 peripheral processing unit; 81, 122 system program; 82, 121 time synchronization program; 83, 127 communication program; 84, 128 resend program; 85, 129 notification program; 86, 170 connection information table; 87, 180 schedule information; 88, 126 configuration; 89 trigger time; 90, 90A, 90B, 90C, 90D, 90E, 90F field apparatus; 91, 112 processor; 92 memory; 93 communication IN; 100, 100A, 100B PLC; 94, 130 communication circuit; 95, 108, 144 memory card interface; 96, 116 memory card; 99, 99A to 99F, 160, 160A, 160B, 200A timer; 107, 140 controller; 110 computing processing unit; 114 storage unit; 119 storage; 120 peripheral processing program; 123 scheduler; 124 user program; 125 IO refresh program; 132, 941 buffer; 134, 944 input data; 135, 943 output data; 136, 137, 971, 972 communication port; 171, 172 port information; 173 apparatus information; 174 able/unable-to-respond information; 177 resend processing time period; 184 time of arrival; 185 output synchronization; 200 master; 500 support apparatus

The invention claimed is:

1. A control system in which a plurality of apparatuses in time synchronization with one another are connected to a network, wherein the network is configured to transfer a frame periodically exchanged by the plurality of apparatuses, the plurality of apparatuses include at least one control device and an apparatus controlled by the control device, each of the plurality of apparatuses is connected over the network, to a first apparatus configured to transmit the frame that arrives at each of the plurality of apparatuses and a second apparatus configured to receive the frame transmitted from each of the plurality of apparatuses, each of the apparatuses includes information on a frame-the frame transfer path and transfer timing based on synchronous time, and when the frame does not arrive at defined time through the transfer path and when a condition associated with a cycle is satisfied, at least one of the plurality of apparatuses is configured to transmit a resend request requesting to resend the frame through the transfer path to the first apparatus connected to the network.

2. The control system according to claim 1, wherein the cycle includes a time period for exchange of the frame by the plurality of apparatuses and a time period for a control operation performed by the at least one control device based on data in the exchanged frame, and the condition includes a condition based on an allowance time calculated by subtracting the time period for exchange of the frame and the time period for the control operation from the cycle and a time period for response to the resend request.

3. The control system according to claim 2, wherein when the condition associated with the cycle is not satisfied, the at least one control device is configured to perform the control operation based on data in the frame that arrived in a previous cycle or to use a value calculated in the previous cycle for control.

4. The control system according to claim 1, wherein when the at least one apparatus transfers the resend request to the first apparatus over the network, the at least one apparatus is configured to transfer the frame non-arrival notification to the second apparatus over the network.

5. The control system according to claim 1, wherein the frame transferred by the network includes the frame of control-oriented data used for the control and a frame-the frame of non-control-oriented data, and the at least one apparatus is configured to transmit the resend request only for the frame of the control-oriented data, of the frame of the control-oriented data and the frame of the non-control-oriented data.

6. The control system according to claim 1, wherein the at least one apparatus is connected to a plurality of the first apparatuses over the network, and the at least one apparatus includes a resend processing module configured to detect an apparatus capable of responding to the resend request among the plurality of first apparatuses and to transmit the resend request to the detected apparatus.

7. The control system according to claim 1, wherein a protocol for network communication between the control devices and a protocol for network communication between the control device and the controlled apparatus are identical.

8. An apparatus provided in a control system, wherein the control system includes a plurality of the apparatuses connected to a network and being in time synchronization with one another, the network is configured to transfer the frame periodically exchanged by the plurality of apparatuses, the apparatus is connected over the network, to a first apparatus configured to transmit the frame that arrives at the apparatus and a second apparatus configured to receive the frame transmitted from the apparatus, the apparatus includes information on the frame transfer path and transfer timing based on synchronous time, and when the frame does not arrive at defined time through the transfer path and when a condition associated with the cycle is satisfied, the apparatus is configured to transmit a resend request requesting to resend the frame through the transfer path to the frist apparatus connected to the network.

9. A method of controlling communication by an apparatus included in a control system, the control system including a plurality of the apparatuses connected to a network and being in time synchronization with one another, the network being configured to transfer the frame periodically exchanged by the plurality of apparatuses, the apparatus being connected over the network, to a first apparatus configured to transmit the frame that arrives at the apparatus and a second apparatus configured to receive the frame transmitted from the apparatus, the apparatus including information on the frame transfer path and transfer timing based on synchronous time, the method comprising:

receiving the frame that arrives at the apparatus over the network;

detecting whether the frame arrives at the apparatus at defined time through the transfer path; and transmitting, when the frame does not arrive and when a condition associated with the cycle is satisfied, a resend request requesting to resend the frame through the transfer path to the first apparatus connected to the network.

* * * * *